US011530591B2

(12) United States Patent
Witkowski et al.

(10) Patent No.: US 11,530,591 B2
(45) Date of Patent: Dec. 20, 2022

(54) LARGE BORE PLUG VALVE

(71) Applicant: SPM Oil & Gas Inc., Fort Worth, TX (US)

(72) Inventors: Brian C. Witkowski, Fort Worth, TX (US); Nuder Said, Fort Worth, TX (US); Duc Thanh Tran, Spring, TX (US)

(73) Assignee: SPM Oil & Gas Inc., Fort Worth, TX (US)

( * ) Notice: Subject to any disclaimer, the term of this patent is extended or adjusted under 35 U.S.C. 154(b) by 104 days.

(21) Appl. No.: 16/864,448

(22) Filed: May 1, 2020

(65) Prior Publication Data

US 2020/0256149 A1    Aug. 13, 2020

Related U.S. Application Data

(62) Division of application No. 15/631,564, filed on Jun. 23, 2017, now abandoned.

(Continued)

(51) Int. Cl.
*E21B 33/068* (2006.01)
*F04B 15/02* (2006.01)
(Continued)

(52) U.S. Cl.
CPC ............ *E21B 33/068* (2013.01); *B01F 23/43* (2022.01); *B01F 27/05* (2022.01); *E21B 33/038* (2013.01);
(Continued)

(58) Field of Classification Search
CPC ...... E21B 33/068; E21B 33/038; E21B 43/26; B01F 23/43; B01F 27/05; B01F 2101/49;
(Continued)

(56) References Cited

U.S. PATENT DOCUMENTS 2,729,420 A * 1/1956 Schenck ............... F16K 5/0271
251/192
2,864,580 A ‡ 12/1958 Lemoine ............... F16K 27/065
251/31

(Continued)

FOREIGN PATENT DOCUMENTS

| CN | 103270241 A | 8/2013 |
| CN | 104685274 A | 6/2015 |
| CN | 105008033 A | 10/2015 |

OTHER PUBLICATIONS

Thomas, Shane, "IWritten Opinion", International Application No. PCT/US2017/039005, dated Oct. 25, 2017, 13 pages.‡

(Continued)

*Primary Examiner* — James G Sayre
(74) *Attorney, Agent, or Firm* — Foley & Lardner LLP

(57) ABSTRACT

A plug valve including a valve body defining an internal cavity, a first passage, and a second passage, a plug defining a third passage and being rotatable within the internal cavity, and an insert extending within the internal cavity between the valve body and the plug. The insert defines an interior surface and an opening aligned with the first passage of the valve body. The insert may also define a sealing surface extending around the opening and standing in relief against the interior surface to sealingly engage the plug. In addition to, or instead of, the sealing surface, the insert may define a projection at least partially defining the interior surface. In addition, a boot may be connected to the valve body and interlocked with the projection to prevent, or at least reduce, rotation of the insert relative to the valve body when the plug rotates within the internal cavity.

19 Claims, 15 Drawing Sheets

Related U.S. Application Data

(60) Provisional application No. 62/421,019, filed on Nov. 11, 2016, provisional application No. 62/412,230, filed on Oct. 24, 2016, provisional application No. 62/393,990, filed on Sep. 13, 2016, provisional application No. 62/354,101, filed on Jun. 23, 2016.

(51) Int. Cl.

| | |
|---|---|
| F04B 23/04 | (2006.01) |
| F04B 47/00 | (2006.01) |
| B01F 23/43 | (2022.01) |
| B01F 27/05 | (2022.01) |
| E21B 33/038 | (2006.01) |
| E21B 43/26 | (2006.01) |
| F16K 5/04 | (2006.01) |
| F16K 11/048 | (2006.01) |
| F16K 31/126 | (2006.01) |
| F04B 23/06 | (2006.01) |
| F16L 41/03 | (2006.01) |
| B01F 101/49 | (2022.01) |
| F16K 5/00 | (2006.01) |
| F16K 11/00 | (2006.01) |

(52) U.S. Cl.
 CPC .............. E21B 43/26 (2013.01); F04B 15/02 (2013.01); F04B 23/04 (2013.01); F04B 23/06 (2013.01); F04B 47/00 (2013.01); F16K 5/04 (2013.01); F16K 11/048 (2013.01); F16K 31/126 (2013.01); F16L 41/03 (2013.01); B01F 2101/49 (2022.01); F16K 5/00 (2013.01); F16K 11/00 (2013.01)

(58) Field of Classification Search
 CPC .......... F04B 15/02; F04B 23/04; F04B 23/06; F04B 47/00; F16K 5/04; F16K 11/048; F16K 31/126; F16K 5/00; F16K 11/00; F16K 5/0471; F16K 5/08; F16K 27/065; F16K 31/535; F16L 41/03
 See application file for complete search history.

(56) References Cited

U.S. PATENT DOCUMENTS

| | | | | |
|---|---|---|---|---|
| 2,997,057 | A ‡ | 10/1961 | Toth .................... | F16K 5/0471 137/31 |
| 3,061,267 | A * | 10/1962 | Hamer .................. | F16K 5/0471 137/246.22 |
| 3,072,379 | A ‡ | 1/1963 | Hamer .................. | F16K 5/0471 251/17 |
| 3,128,987 | A | 4/1964 | O'Connor | |
| 3,133,722 | A * | 5/1964 | McGuire ................ | F16K 5/185 251/317 |
| 3,199,835 | A | 8/1965 | Freed | |
| 3,206,163 | A | 9/1965 | Freed | |
| 3,276,739 | A ‡ | 10/1966 | Freed .................... | F16K 5/025 251/31 |
| 3,404,904 | A | 10/1968 | Roe | |
| 3,425,661 | A ‡ | 2/1969 | Mayo .................... | F16K 5/14 251/17 |
| 3,547,403 | A ‡ | 12/1970 | Grauer .................. | F16K 5/0631 251/17 |
| 3,916,950 | A ‡ | 11/1975 | Mongerson .......... | F16K 5/0414 137/62 |
| 4,127,991 | A ‡ | 12/1978 | Regan .................... | E21B 7/128 175/7 |
| 4,901,563 | A ‡ | 2/1990 | Pearson .......... | B01F 15/00207 166/30 |
| 6,554,249 | B2 ‡ | 4/2003 | Pang ...................... | F16K 5/188 251/17 |
| 8,376,046 | B2 ‡ | 2/2013 | Broussard, II ........ | E21B 43/26 166/30 |
| 8,944,159 | B2 ‡ | 2/2015 | Guidry .................. | E21B 43/26 |
| 9,127,545 | B2 | 9/2015 | Kajaria et al. | |
| 9,903,190 | B2 ‡ | 2/2018 | Conrad .................. | E21B 43/26 |
| 2006/0027779 | A1* | 2/2006 | McGuire .............. | F16K 5/0478 137/15.17 |
| 2010/0032031 | A1 | 2/2010 | Neal | |
| 2011/0272158 | A1 ‡ | 11/2011 | Neal ...................... | B67D 7/78 166/30 |
| 2012/0181046 | A1 ‡ | 7/2012 | Kajaria ................ | E21B 43/26 166/38 |
| 2012/0242081 | A1 ‡ | 9/2012 | Keays ................... | F16L 27/053 285/14 |
| 2013/0175039 | A1 ‡ | 7/2013 | Guidry .................. | E21B 17/05 166/30 |
| 2013/0233560 | A1* | 9/2013 | Davidson .............. | E21B 43/26 166/308.1 |
| 2013/0284455 | A1 ‡ | 10/2013 | Kajaria ................. | F16L 23/08 166/37 |
| 2014/0048158 | A1 ‡ | 2/2014 | Baca ..................... | E21B 33/068 137/51 |
| 2014/0048734 | A1 ‡ | 2/2014 | Witkowski ............ | F16K 5/0457 251/30 |
| 2014/0290768 | A1 ‡ | 10/2014 | Randle ................... | E21B 43/26 137/565.16 |
| 2015/0000766 | A1 ‡ | 1/2015 | Arizpe .................. | F16L 55/035 137/35 |
| 2015/0275629 | A1 ‡ | 10/2015 | Hatton .................. | F16L 27/12 285/29 |
| 2015/0316156 | A1 ‡ | 11/2015 | Nagahama .......... | F16K 11/0853 137/62 |
| 2016/0115773 | A1 ‡ | 4/2016 | Conrad .................. | E21B 43/26 166/30 |
| 2017/0122060 | A1 ‡ | 5/2017 | Dille ..................... | B60P 3/2205 |
| 2017/0130555 | A1 | 5/2017 | Kajaria et al. | |
| 2017/0138144 | A1 ‡ | 5/2017 | Christopherson ....... | E21B 43/26 |
| 2017/0268306 | A1 ‡ | 9/2017 | Kajaria .................. | F16L 41/03 |
| 2017/0370199 | A1 ‡ | 12/2017 | Witkowski ............ | B01F 3/0853 |
| 2018/0073308 | A1 ‡ | 3/2018 | Tran ...................... | F16L 27/053 |
| 2018/0187662 | A1 ‡ | 7/2018 | Hill ........................ | F16L 41/02 |
| 2018/0298735 | A1 ‡ | 10/2018 | Conrad .................. | E21B 43/26 |

OTHER PUBLICATIONS

Thomas, Shane, "International Search Report", International Application No. PCT/US2017/039005, dated Oct. 25, 2017, 6 pages.‡
International Search Report and Written Opinion re International Application No. PCT/US2017/039020, dated Nov. 6, 2017, 17 pages.
U.S. Appl. No. 15/631,534, filed Jun. 23, 2017, Adjustable Fracturing System.
U.S. Appl. No. 16/709,616, filed Dec. 10, 2019, Hydraulic Fracturing System, Apparatus, and Method.
U.S. Appl. No. 16/352,362, filed Dec. 10, 2019, Hydraulic Fracturing System, Apparatus, and Method.
Chinese Office Action for Int'l. Patent Appln. No. 202110109042.9, dated Jul. 4, 2022 (9 pgs).

\* cited by examiner
‡ imported from a related application

LARGE BORE PLUG VALVE

CROSS-REFERENCE TO RELATED APPLICATIONS

This application is a divisional of and claims priority to U.S. patent application Ser. No. 15/631,564, filed Jun. 23, 2017, which claims the benefit of and priority to U.S. Provisional Application No. 62/354,101, filed Jun. 23, 2016, U.S. Provisional Application No. 62/393,990, filed Sep. 13, 2016, U.S. Application No. 62/412,230, filed Oct. 24, 2016, and U.S. Application No. 62/421,019, filed Nov. 11, 2016, the entire disclosures of which are hereby incorporated herein by reference.

TECHNICAL FIELD

The present disclosure relates in general to valves and, in particular, to a "large bore" plug valve used in oil or gas operations.

BACKGROUND

In oil or gas operations, one or more plug valves may be used to control fluid flow; one such plug valve generally includes a valve body defining a pair of fluid passages intersecting an internal cavity. The internal cavity of the valve body accommodates a plug and an insert, which insert extends within an annular space between the plug and the valve body. The plug and the insert include fluid passages that are adapted to be substantially aligned with the fluid passages of the valve body. The plug is adapted to rotate relative to the insert and the valve body to selectively permit fluid flow through the respective fluid passages of the valve body, the insert, and the plug. During operation, the insert is meant to seal against the plug and the valve body to thereby prevent migration of the fluid flow into the annular region between the plug and the valve body. To establish a suitable seal between the insert and the plug, contact pressure between the insert and the plug must be maintained above a threshold level.

During rotation of the plug, friction between the plug and the insert can cause the insert to shift, turn, or rotate relative to the valve body. The shifting, turning, or rotation of the insert relative to the valve body causes misalignment between the fluid passages of the insert, the valve body, and the plug. This misalignment typically causes wear, erosion, or complete wash-out of the insert, the valve body, and/or the plug. In addition, the force required to maintain the contact pressure between the insert and the plug above the threshold level often increases the amount of friction between the insert and the plug, thereby exacerbating the issue(s) described above. Indeed, in some instances, excessive friction between the insert and the plug can make rotation of the plug relative to the insert difficult or impossible. These issues, among others, are particularly acute for "large bore" plug valves in which the fluid passage of the plug has a relatively large diameter (e.g., about 5⅛ inches, greater than about 5⅛ inches, etc.).

Therefore, to make possible the manufacture of an effective and reliable "large bore" plug valve, what is needed is an apparatus, system, or method to address one or more of the foregoing issues, and/or one or more other issues.

SUMMARY

In a first aspect, the present disclosure introduces an apparatus, including a valve body defining an internal cavity, a first passage, and a second passage; a plug defining a third passage and being rotatable within the internal cavity to selectively permit communication of a fluid between the first and second passages via the third passage; and an insert extending within the internal cavity between the valve body and the plug, the insert defining a first opening aligned with the first passage of the valve body, a first interior surface, and a first sealing surface extending around the first opening and standing in relief against the first interior surface to sealingly engage the plug; wherein migration of the fluid into an annular region between the insert and the plug is prevented, or at least reduced, by the sealing engagement of the first sealing surface with the plug.

In an embodiment, the insert includes a first segment including the first interior surface, the first opening, and the first sealing surface.

In another embodiment, the insert further defines a second opening aligned with the second passage of the valve body, a second interior surface, and a second sealing surface extending around the second opening and standing in relief against the second interior surface to sealingly engage the plug.

In yet another embodiment, migration of the fluid into the annular region between the insert and the plug is prevented, or at least reduced, by the respective sealing engagements of the first and second sealing surfaces with the plug.

In certain embodiments, the insert includes a first segment including the first interior surface, the first opening, and the first sealing surface, and a second segment including the second interior surface, the second opening, and the second sealing surface.

In an embodiment, the insert further includes third and fourth segments interconnecting the first and second segments so that, in combination, the first, second, third, and fourth segments surround the plug.

In another embodiment, the apparatus further comprises a flow iron section adapted to be positioned between a hydraulic fracturing pump and a wellhead, the flow iron section including one or more of a pressurization manifold adapted to be connected to the hydraulic fracturing pump, a hydraulic fracturing tree adapted to be connected to the wellhead, and a distribution manifold adapted to be connected between the pressurization manifold and the hydraulic fracturing tree; wherein the valve body is connected to the flow iron section so that the plug is rotatable within the valve body to selectively permit communication of a hydraulic fracturing fluid from the hydraulic fracturing pump to the wellhead via at least the flow iron section and the third passage.

In a second aspect, the present disclosure introduces an apparatus, including a valve body defining an internal cavity, a first passage, and a second passage; a plug defining a third passage and being rotatable within the internal cavity to selectively permit communication of a fluid between the first and second passages via the third passage; an insert extending within the internal cavity between the valve body and the plug, the insert defining a first opening aligned with the first passage of the valve body, a first interior surface, and a first projection at least partially defining the first interior surface; and a boot connected to the valve body and interlocked with the first projection of the insert to prevent, or at least reduce, rotation of the insert relative to the valve body when the plug rotates within the internal cavity.

In an embodiment, the first projection includes first and second side surfaces, and the boot includes first and second edge portions extending adjacent the first and second side surfaces, respectively, of the first projection.

In another embodiment, the boot further includes a third edge portion extending between the first and second edge portions and adjacent the first interior surface of the insert.

In yet another embodiment, the insert further defines a second opening aligned with the second passage of the valve body, a second interior surface, and a second projection at least partially defining the second interior surface; and the boot is interlocked with the second projection of the insert to prevent, or at least reduce, rotation of the insert relative to the valve body when the plug rotates within the internal cavity.

In certain embodiments, the first projection includes first and second side surfaces, and the boot includes first and second edge portions extending adjacent the first and second side surfaces, respectively, of the first projection; and the second projection includes third and fourth side surfaces, and the boot includes third and fourth edge portions extending adjacent the third and fourth side surfaces, respectively, of the second projection.

In an embodiment, the boot further includes a fifth edge portion extending between the first and second edge portions and adjacent the first interior surface of the insert; and a sixth edge portion extending between the third and fourth edge portions and adjacent the second interior surface of the insert.

In another embodiment, the insert includes a first segment including the first interior surface, the first projection, and the first opening, and a second segment including the second interior surface, the second projection, and the second opening.

In yet another embodiment, the insert further includes third and fourth segments interconnecting the first and second segments so that, in combination, the first, second, third, and fourth segments surround the plug.

In certain embodiments, the apparatus further comprises a flow iron section adapted to be positioned between a hydraulic fracturing pump and a wellhead, the flow iron section including one or more of a pressurization manifold adapted to be connected to the hydraulic fracturing pump, a hydraulic fracturing tree adapted to be connected to the wellhead, and a distribution manifold adapted to be connected between the pressurization manifold and the hydraulic fracturing tree; wherein the valve body is connected to the flow iron section so that the plug is rotatable within the valve body to selectively permit communication of a hydraulic fracturing fluid from the hydraulic fracturing pump to the wellhead via at least the flow iron section and the third passage.

In a third aspect, the present disclosure introduces an apparatus, including a flow iron section adapted to be positioned between a hydraulic fracturing pump and a wellhead, the flow iron section including one or more of a pressurization manifold adapted to be connected to the hydraulic fracturing pump, a hydraulic fracturing tree adapted to be connected to the wellhead, and a distribution manifold adapted to be connected between the pressurization manifold and the hydraulic fracturing tree; and a plug valve connected to the flow iron section, the plug valve including a valve body and a plug, the plug defining a first passage and being rotatable within the valve body to selectively permit communication of a hydraulic fracturing fluid from the hydraulic fracturing pump to the wellhead via at least the flow iron section and the first passage, the first passage having an inner diameter that is equal to, or greater than, about 5⅛ inches.

In an embodiment, the valve body further defines second and third passages configured to communicate with one another via the first passage of the plug when communication of the hydraulic fracturing fluid is selectively permitted from the hydraulic fracturing pump to the wellhead via at least the flow iron section and the first passage.

In another embodiment, the plug valve further includes an insert extending between the valve body and the plug, the insert defining an opening aligned with the first passage of the valve body, an interior surface, and a sealing surface extending around the opening and standing in relief against the interior surface to sealingly engage the plug.

In yet another embodiment, the plug valve further includes an insert extending within the valve body between the valve body and the plug, the insert defining an opening aligned with the first passage of the valve body, an interior surface, and a projection at least partially defining the interior surface; and a boot connected to the valve body and interlocked with the projection of the insert to prevent, or at least reduce, rotation of the insert relative to the valve body when the plug rotates within the valve body.

DETAILED DESCRIPTION

Figure 1A:
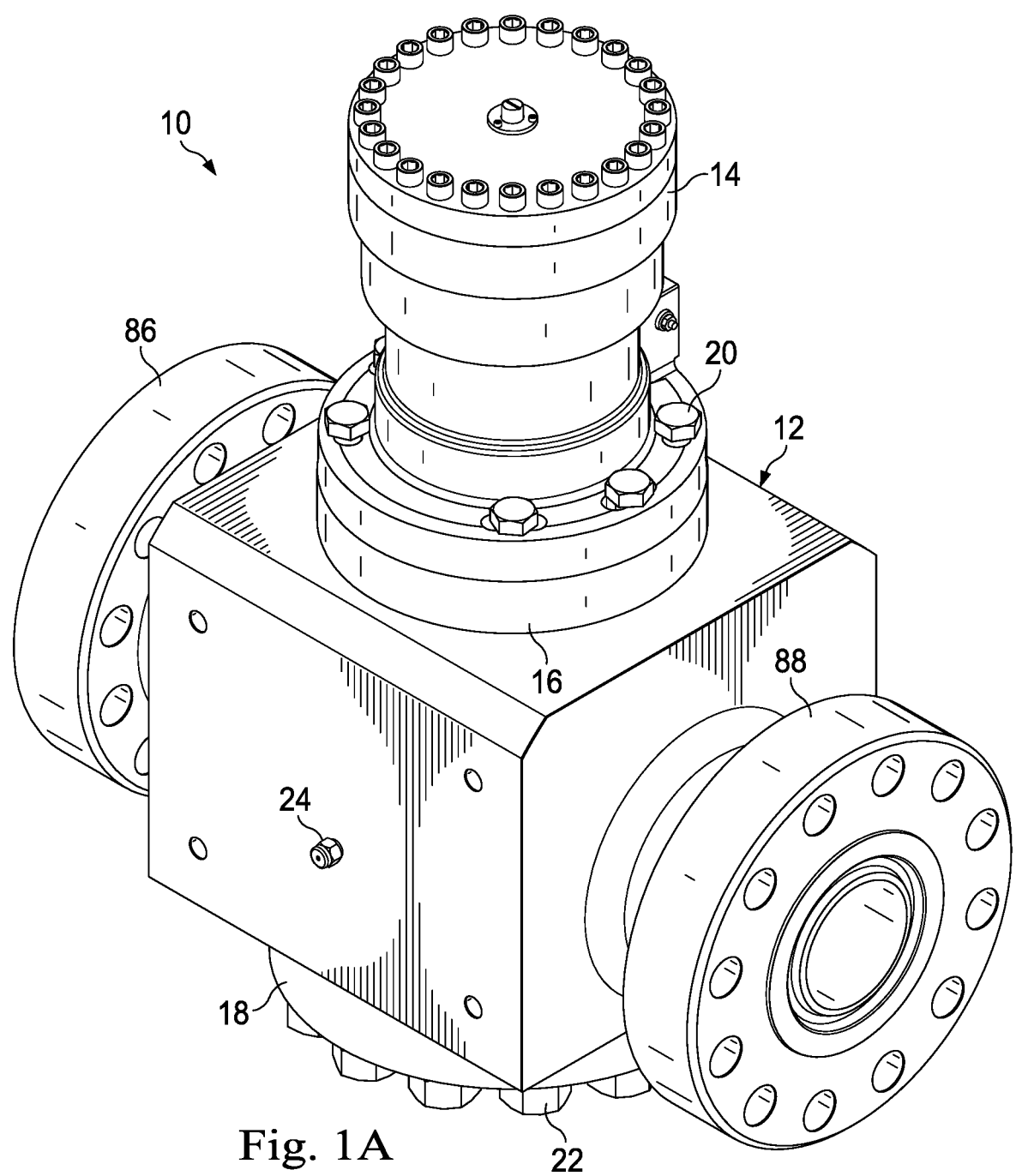
FIG. 1A is a perspective view illustrating a plug valve, according to one or more embodiments of the present disclosure.
Figure 1B:
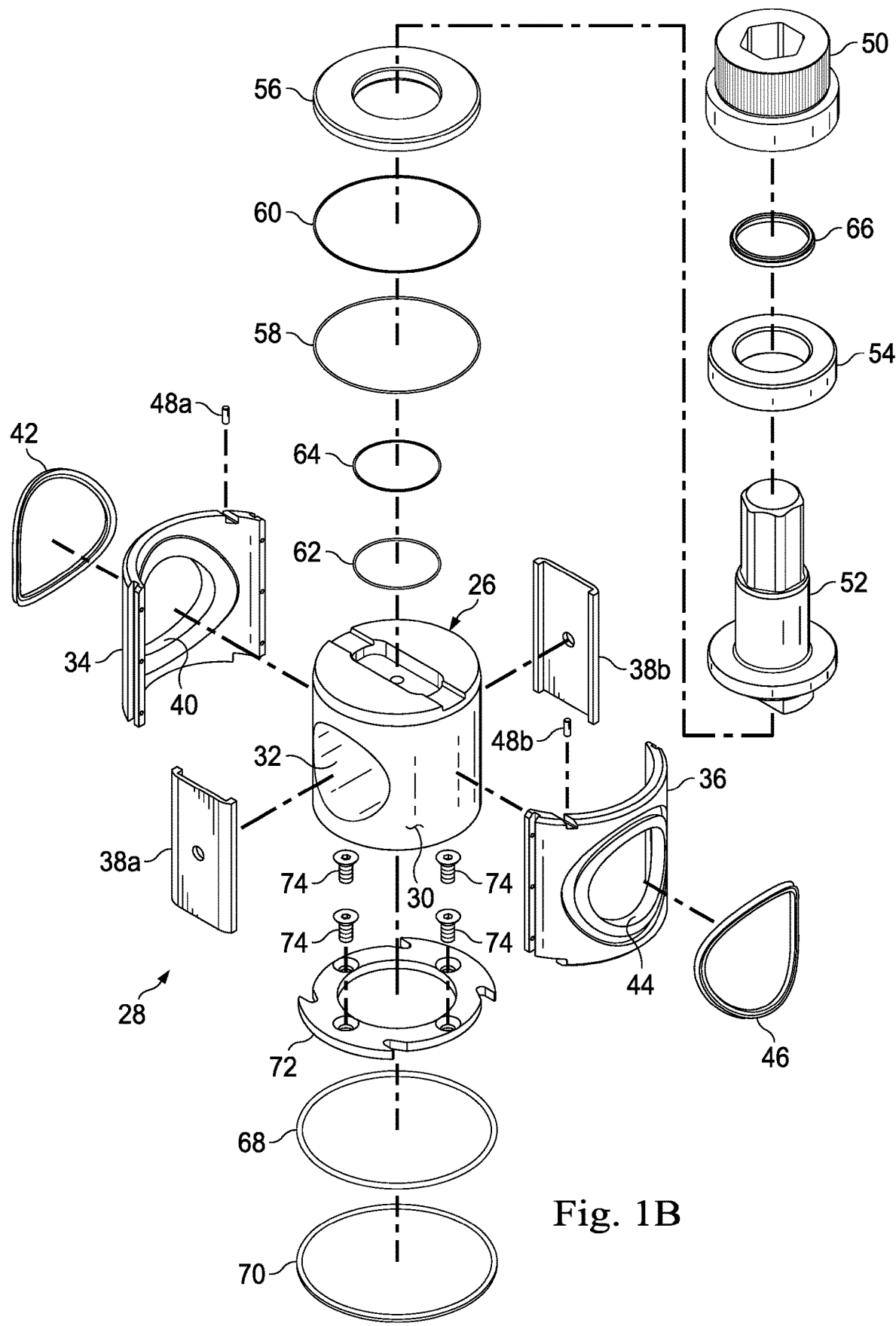
FIG. 1B is an exploded perspective view illustrating internal components of the plug valve of FIG. 1A, including, inter alia, a plug, an inlet segment, an outlet segment, and a boot, according to one or more embodiments of the present disclosure.

Turning initially to FIGS. 1A and 1B, an example embodiment of a plug valve, generally referred to by the reference numeral 10, is illustrated. As shown in FIG. 1A, the plug valve 10 includes a valve body 12, an actuator 14, an actuator plate 16, and a cover plate 18. The actuator 14 is connected to the actuator plate 16 via a plurality of fasteners 20, and the actuator plate 16 is connected to the valve body 12. The cover plate 18 is connected to the valve body 12 via a plurality of fasteners 22, opposite the actuator plate 16. In some embodiments, the cover plate 18 is considered part of the valve body 12. The plug valve 10 includes one or more lubrication fittings 24 connected to the valve body 12 to facilitate lubrication of internal component(s) of the plug valve 10. The actuator 14 is adapted to actuate the plug valve 10 between an open configuration in which fluid flow is permitted through the plug valve 10 and a closed configuration in which fluid flow through the plug valve 10 is prevented, or at least reduced.

The valve body 12, the actuator 14, the actuator plate 16, and the cover plate 18 are omitted from view in FIG. 1B to more clearly illustrate the internal components of the plug valve 10. Turning to FIG. 1B, the plug valve 10 further includes a plug 26 and an insert 28, which plug 26 defines an exterior surface 30 and a fluid passage 32 extending transversely therethrough. The insert 28 is adapted to extend about and sealingly engage the exterior surface 30 of the plug 26. The insert 28 includes an inlet segment 34, an outlet segment 36, and side segments 38a and 38b. The inlet segment 34 includes an inlet opening 40 and is adapted to accommodate an inlet seal 42 around the inlet opening 40. The inlet seal 42 is adapted to engage the valve body 12. The outlet segment 36 includes an outlet opening 44 and is adapted to accommodate an outlet seal 46 around the outlet opening 44. The outlet seal 46 is adapted to engage the valve body 12. The side segments 38a and 38b are adapted to connect the inlet segment 34 to the outlet segment 36 to thereby place a compressive load on the plug 26. The plug valve 10 includes alignment dowels 48a and 48b to facilitate the alignment of the inlet and outlet openings 40 and 44 within the valve body 12.

The plug valve 10 also includes a drive gear 50 and an adapter 52 via which the actuator 14 is adapted to be operably coupled to the plug 26. The adapter 52 is adapted to be supported within the valve body 12 via a bearing 54 and a spacer 56. The spacer 56 is adapted to accommodate an outer seal 58 and an outer backup ring 60 so that the outer seal 58 engages the spacer 56 and the valve body 12. The spacer 56 is further adapted to accommodate an inner seal 62 and an inner backup ring 64 so that the inner seal 62 engages the spacer 56 and the adapter 52. The valve body 12 is adapted to accommodate a wiper seal 66 so that the wiper seal 66 engages the adapter 52 and the valve body 12 to prevent drainage of fluid (e.g., lubricating fluid) from the actuator 14 into the valve body 12. The cover plate 18 is adapted to accommodate a seal 68 and a backup ring 70 so that the seal 68 engages the cover plate 18 and the valve body 12. The plug valve 10 includes a boot 72 adapted to be connected to the cover plate 18 via a plurality of fasteners 74. Thus, the boot 72 is adapted to be connected to the valve body 12 in those embodiments in which the cover plate 18 is considered part of the valve body 12. The boot 72 is adapted to interlock with the insert 28 to thereby prevent, or at least reduce, rotation of the insert 28 relative to the valve body 12 when the plug 26 rotated.

Figure 2:
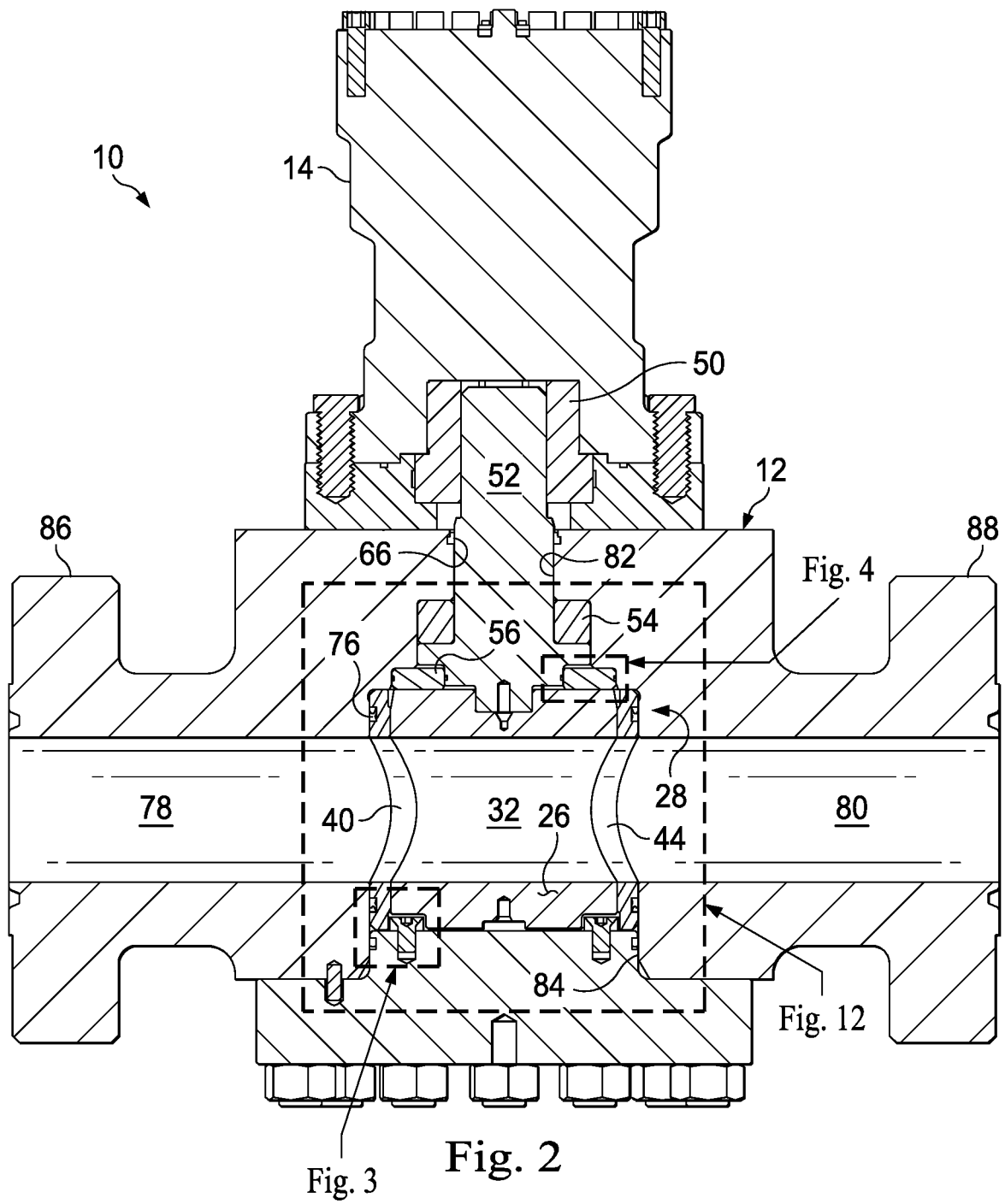
FIG. 2 is a cross-sectional view of the plug valve of FIG. 1A, including the plug, the inlet segment, the outlet segment, and the boot, according to one or more embodiments of the present disclosure.

Turning to FIG. 2, with continuing reference to FIGS. 1A and 1B, it can be seen that the valve body 12 defines an internal cavity 76, an inlet passage 78, an outlet passage 80, an actuator bore 82, and an access port 84. The inlet passage 78 permits fluid communication between the valve body 12 and an adjacent flow-line component such as, for example, the flow-line component 134 shown in FIGS. 18A and 18B, which will be discussed in further detail below. The valve body 12 includes a flange 86 around the inlet passage 78 to facilitate connection of the valve body 12 to the adjacent flow-line component. The flange 86 includes a through-hole pattern (visible in FIG. 1A; or a threaded-hole pattern). The outlet passage 80 permits fluid communication between the valve body 12 and another adjacent flow-line component such as, for example, the flow-line component 136 shown in FIGS. 18A and 18B, which will be discussed in further detail below. The valve body 12 includes a flange 88 around the outlet passage 80 to facilitate connection of the plug valve 10 to the another adjacent flow-line component. The flange 88 includes a through-hole pattern (visible in FIG. 1A; or a threaded-hole pattern). In some embodiments, one or both of the flanges 86 and 88 are omitted and replaced with another type of fluid-line connector such as, for example, the male half of a hammer union, the female half of a hammer union, a hammerless union, another fluid-line connector, or any combination thereof.

The plug 26 extends within the internal cavity 76 of the valve body 12 and is coupled to the actuator 14 via the drive gear 50 and the adapter 52. The adapter 52 is supported within the actuator bore 82 via the bearing 54 and the spacer 56. The wiper seal 66 seals against the adapter 52 and the valve body 12 to thereby prevent drainage of fluid (e.g., lubricating fluid) from the actuator 14 into the valve body 12. The insert 28 extends about and seals against the exterior surface 30 of the plug 26. The inlet and outlet openings 40 and 44 are aligned with the inlet and outlet passages 78 and 80, respectively, of the valve body 12. The actuator 14 is operable to rotate the drive gear 50, the adapter 52, and the plug 26 relative to the valve body 12 to thereby actuate the plug 26 between the open configuration and the closed configuration. As shown in FIG. 2, the fluid passage 32 of the plug 26 is adapted to be aligned with the inlet and outlet openings 40 and 44 of the insert 28 and the inlet and outlet passages 78 and 80 of the valve body 12 when the plug valve 10 is in the open configuration. In some embodiments, the fluid passage 32 has an inner diameter of about 5⅛ inches, of about 7 1/16 inches, or ranging from about 5⅛ inches to about 7 1/16 inches.

Figure 3:
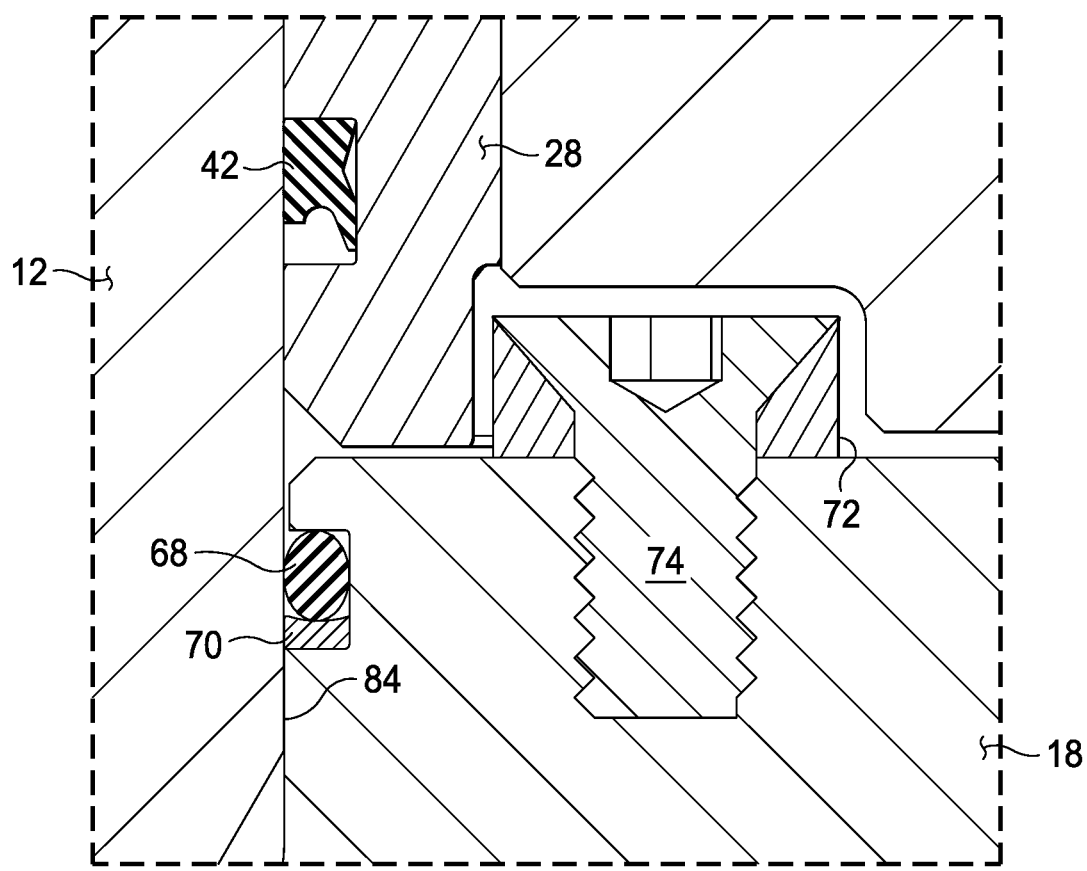
FIG. 3 is an enlarged view of the plug valve of FIG. 2, according to one or more embodiments of the present disclosure.

Turning to FIG. 3, with continuing reference to FIG. 2, it can be seen that the inlet segment 34 accommodates the inlet seal 42 around the inlet opening 40 in a manner that seals the inlet seal 42 against the valve body 12 around the inlet passage 78. Likewise, the outlet segment 36 accommodates the outlet seal 46 around the outlet opening 44 in a manner that seals the outlet seal 46 against the valve body 12 around the outlet passage 80 (visible in FIG. 2). The cover plate 18 extends into the access port 84 and accommodates the seal 68 and the backup ring 70 so that the seal 68 seals against the valve body 12. The boot 72 is connected to the cover plate 18 via the plurality of fasteners 74 in a manner that permits interlocking of the insert 28 with the boot 72. Thus, the boot 72 is connected to the valve body 12 in those embodiments in which the cover plate 18 is considered part of the valve body 12. Alternatively, although described herein as being connected to the cover plate 18, the boot 72 may instead be connected directly to the valve body 12.

Figure 4:
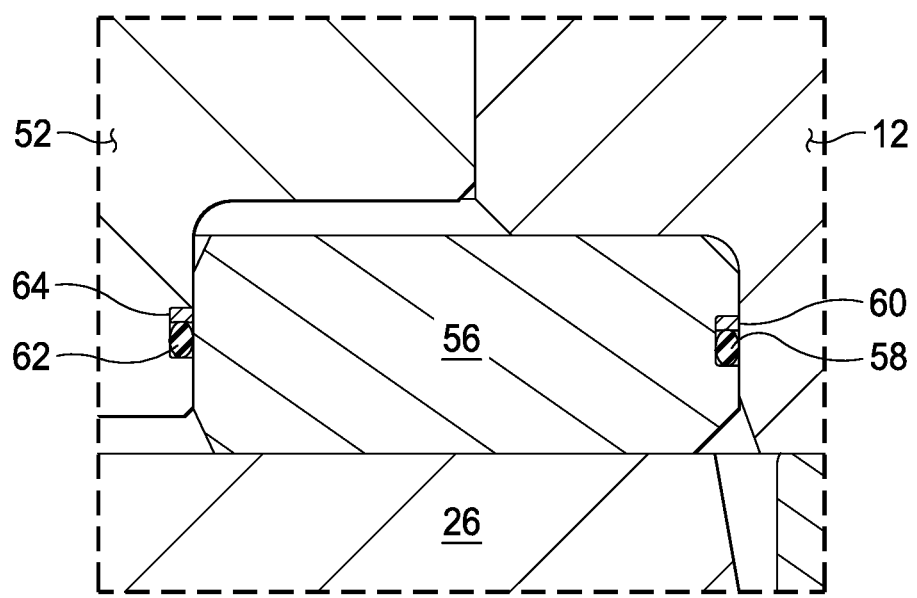
FIG. 4 is another enlarged view of the plug valve of FIG. 2, according to one or more embodiments of the present disclosure.
Figure 5:
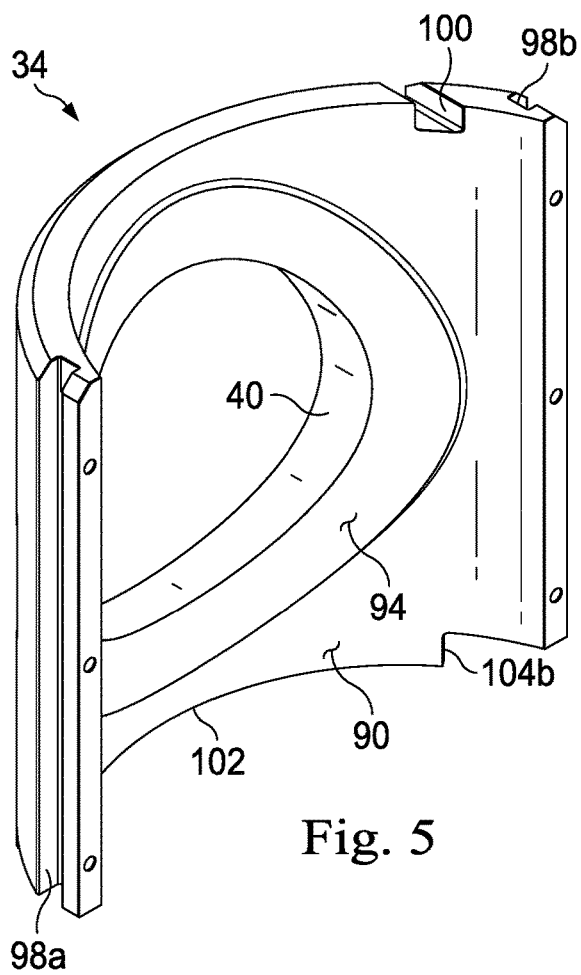
FIGS. 5-8 are rear perspective, front perspective, top plan, and bottom plan views, respectively, of the inlet segment of FIGS. 1B and 2, according to one or more embodiments of the present disclosure.
Figure 6:
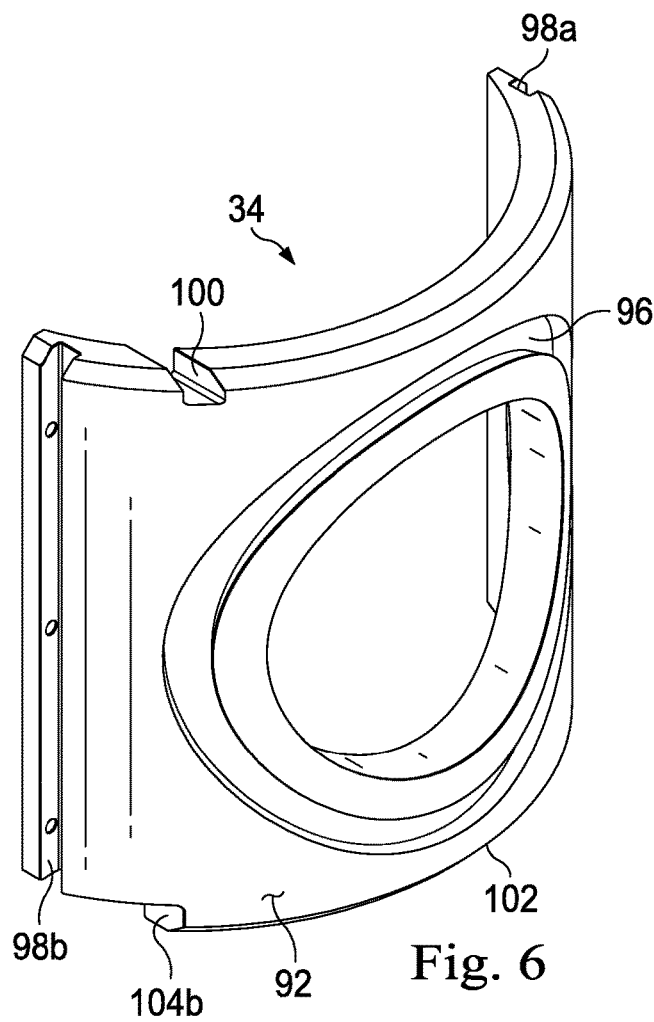
Figure 7:
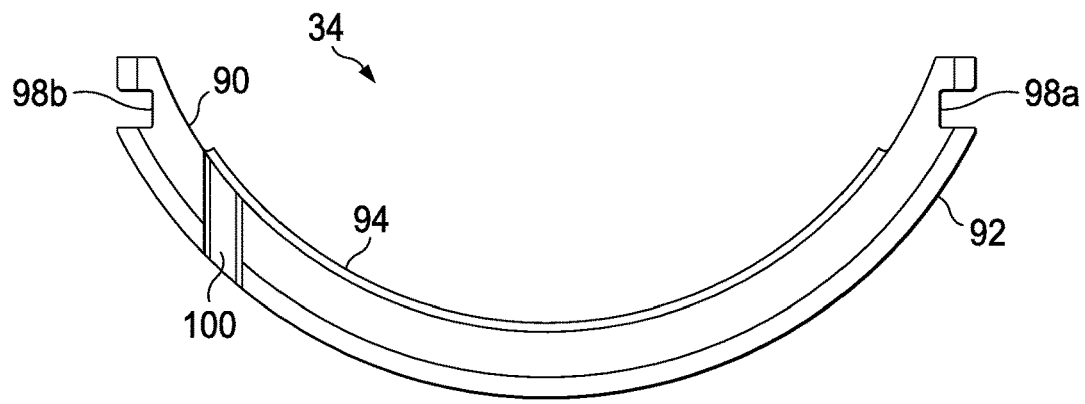
Figure 8:
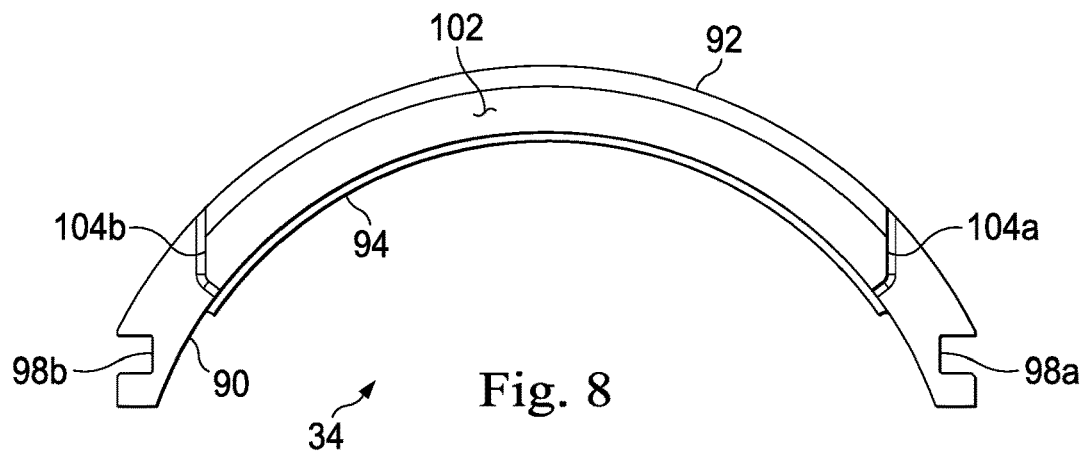

Turning to FIG. 4, with continuing reference to FIG. 2, the spacer 56 accommodates the outer seal 58 and the outer backup ring 60 so that the outer seal 58 seals against the valve body 12. The spacer 56 also accommodates the inner seal 62 and the inner backup ring 64 so that the inner seal 62 seals against the adapter 52.

The outlet segment 36 is substantially identical to the inlet segment 34 and, therefore, in connection with FIGS. 5-8, only the inlet segment 34 will be described in detail below; however, the description below also applies to the outlet segment 36. Turning to FIGS. 5-8, the inlet segment 34 includes a concave interior surface 90 and a convex exterior surface 92. The inlet opening 40 extends through the concave interior surface 90 and the convex exterior surface 92. The inlet segment 34 includes a concave sealing surface 94 formed around the inlet opening 40. The concave sealing surface 94 stands in relief against the concave interior surface 90 to seal against the exterior surface 30 of the plug 26. The inlet segment 34 includes a sealing groove 96 formed in the convex exterior surface 92 and around the inlet opening 40. The sealing groove 96 accommodates the inlet seal 42. The convex exterior surface 92 also includes longitudinally-extending grooves 98a and 98b formed therein to facilitate connection of the inlet segment 34 to the side segments 38a and 38b, respectively. The inlet segment 34 includes an alignment notch 100 to accommodate the dowel 92a when the plug valve 10 is assembled. The inlet segment 34 also includes a projection 102 opposite the alignment notch 100. The projection 102 includes side surfaces 104a and 104b. In some embodiments, the side surfaces 104a and 104b are spaced in a parallel relation. The projection 102 is adapted to interlock with the boot 72 to thereby prevent, or at least reduce, rotation of the insert 28 relative to the valve body 12 when the plug 26 is actuated between the open configuration and the closed configuration, as will be discussed in further detail below.

Figure 9:
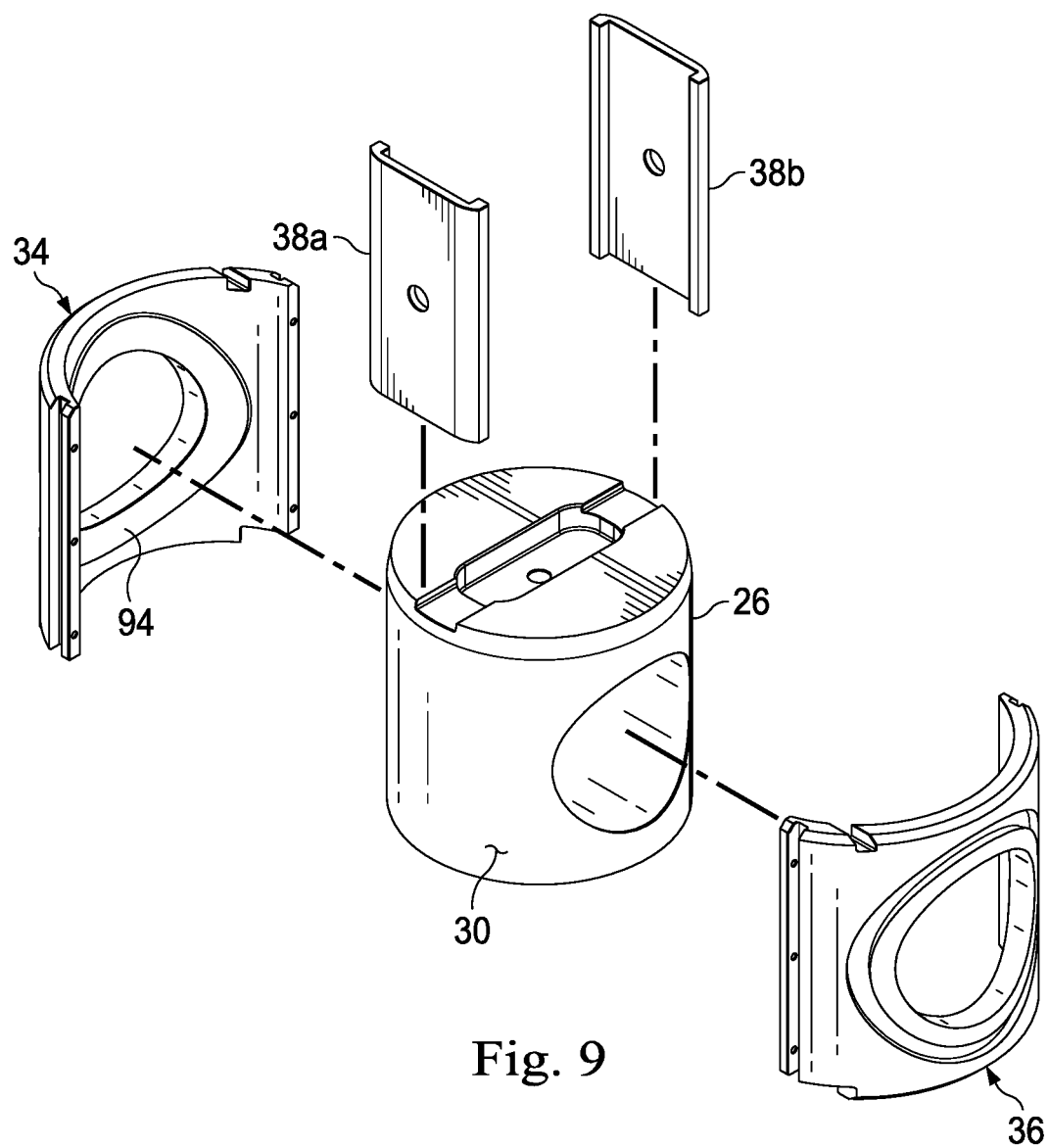
FIGS. 9 and 10 are perspective views illustrating the plug, the inlet segment, and the outlet segment in different stages of assembly, according to one or more embodiments of the present disclosure.
Figure 10:
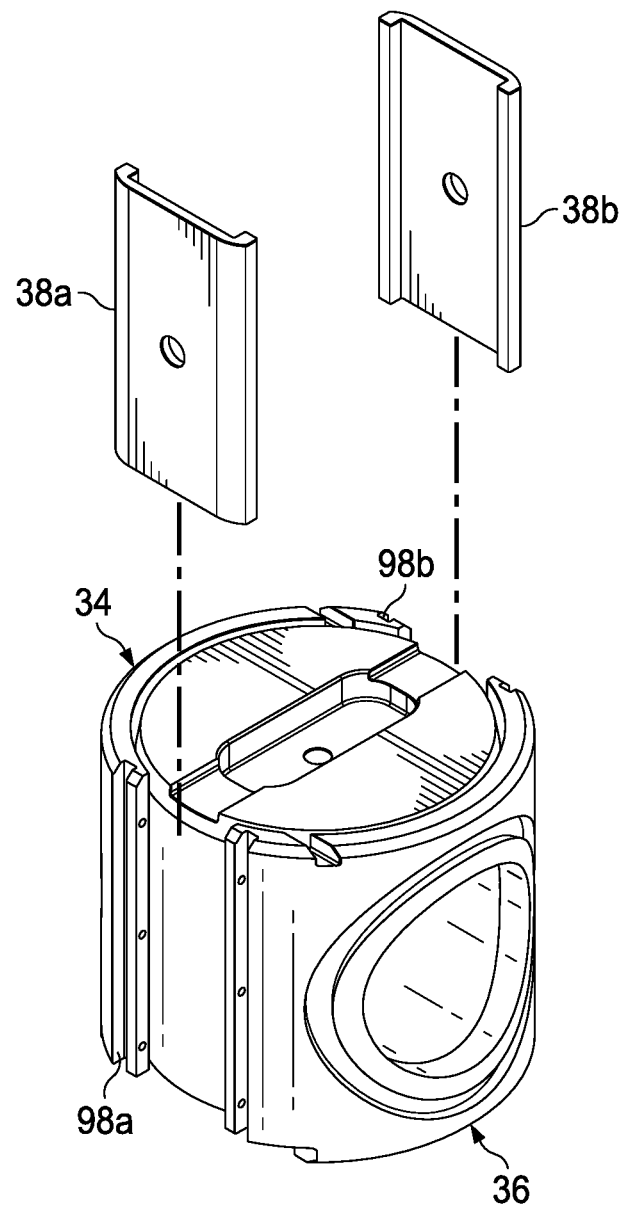

Turning to FIGS. 9 and 10, with continuing reference to FIGS. 5-8, an example embodiment of the manner in which the compressive load is placed on the plug 26 by the insert 28 is illustrated. To begin with, the inlet and outlet segments 34 and 36 are engaged with the exterior surface 30 of the plug 26. Subsequently, the side segment 38a is adapted to be connected to the longitudinally-extending groove 98a of the inlet segment 34 and a longitudinally-extending groove of the outlet segment 36 (which is analogous to the longitudinally-extending groove 98b of the inlet segment 34). Moreover, the side segment 38b is adapted to be connected to the longitudinally-extending groove 98b of the inlet segment 34 and a longitudinally-extending groove of the outlet segment 36 (which is analogous to the longitudinally-extending groove 98a of the inlet segment 34). The connection of the side segments 38a and 38b with the inlet and outlet segments 34 and 36 is adapted to place the side segments 38a and 38b in tension between the inlet and outlet segments 34 and 36 so that the compressive load is placed on the plug 26 by the inlet and outlet segments 34 and 36. The tensioning of the side segments 38a and 38b between the inlet and outlet segments 34 and 36 is adapted to seal the concave sealing surface 94 of the inlet segment 34 against the exterior surface 30 of the plug 26, and to seal a concave sealing surface of the outlet segment 36 (which is analogous to the concave sealing surface 94 of the inlet segment 34) against the exterior surface 30 of the plug 26, opposite the inlet segment 34. During operation, the sealing of the inlet and outlet segments 34 and 36 against the plug 26 is aided by a lubricating fluid (not shown) provided at the interface between the plug 26 and the inlet and outlet segments 34 and 36 via, for example, the lubrication fitting(s) 24 (FIG. 1A). The side segments 38a and 38b are spaced apart from the plug 26 when the side segments 38a and 38b are tensioned between the inlet and outlet segments 34 and 36 (i.e., such that the side segments 38a and 38b do not contact the plug 26).

Although the side segments 38a and 38b have been described herein as being connected to the inlet segment 34's longitudinally-extending grooves 98a and 98b and the outlet segment 36's longitudinally-extending grooves (which are analogous to the inlet segment 34's longitudinally-extending grooves 98a and 98b), the side segments 38a and 38b may be connected to the side segments 38a and 38b in another suitable manner. Moreover, although the compressive load applied to the plug 26 by the inlet and outlet segments 34 and 36 has been described herein as being provided by tensioning of the side segments 38a and 38b between the inlet and outlet segments 34 and 36, the side segments 38a and 38b may alternatively be omitted and the compressive load applied to the plug 26 by the inlet and outlet segments 34 and 36 may be provided by another suitable structure or mechanism.

Figure 11:
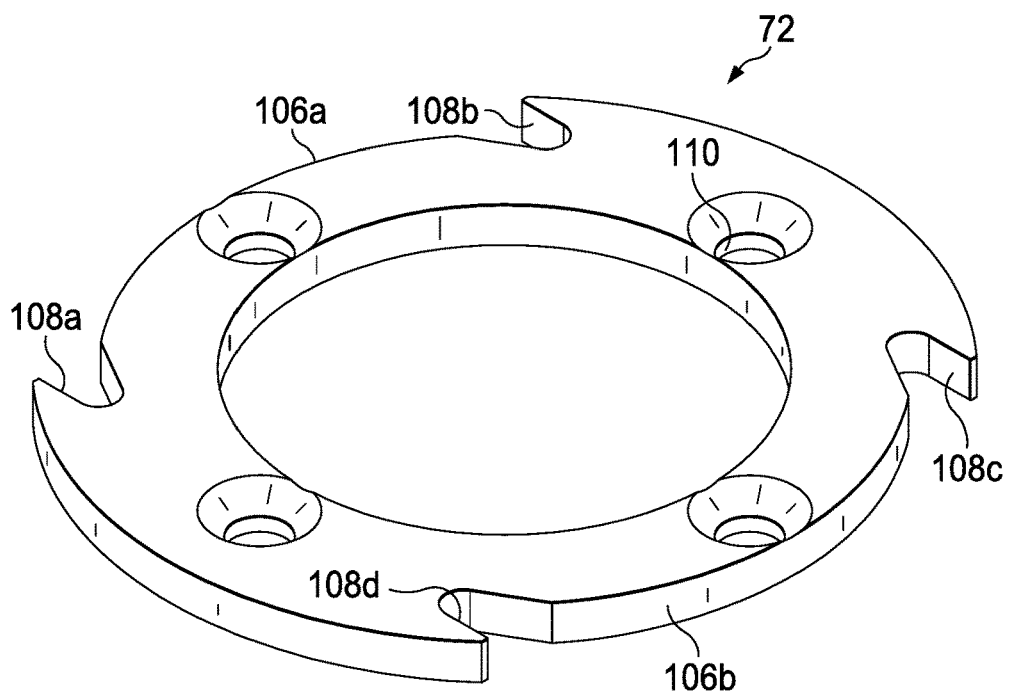
FIG. 11 is a perspective view of the boot of FIGS. 1A and 2, according to one or more embodiments of the present disclosure.

Turning to FIG. 11, with continuing reference to FIGS. 5-10, an example embodiment of the boot 72 is illustrated. The boot 72 includes edge portions 106a and 106b and edge portions 108a-d. In some embodiments, the edge portions 106a and 106b are convex. In some embodiments, the edge portions 108a-d are straight. In some embodiments, the edge portions 106a and 106b are convex and the edge portions 108a-d are straight. The boot 72 includes a through-hole pattern 110 (e.g., including countersunk through-holes) to facilitate connection of the boot 72 to the cover plate 18.

The edge portions 108a and 108b of the boot 72 are adapted to extend adjacent the side surfaces 104a and 104b, respectively, of the inlet segment 34. In some embodiments, the edge portions 108a and 108b are spaced in a parallel relation. Moreover, the edge portion 106a is adapted to extend adjacent the concave interior surface 90 of the inlet segment 34 when the edge portions 108a and 108b of the boot 72 extend adjacent the side surfaces 104a and 104b, respectively, of the inlet segment 34. In this manner, the boot 72 is adapted to interlock with the projection 102 of the inlet segment 34.

The edge portions 108c and 108d of the boot 72 are adapted to extend adjacent surfaces, respectively, of the outlet segment 36. In some embodiments, the edge portions 108c and 108d are spaced in a parallel relation. The surfaces of the outlet segment 36 with which the edge portions 108c and 108d of the boot 72 are adapted to extend adjacent are analogous to the side surfaces 104a and 104b of the inlet segment 34. Moreover, the edge portion 106b of the boot 72 is adapted to extend adjacent a concave interior surface of the outlet segment 36 when the edge portions 108c and 108d extend adjacent the surfaces of the outlet segment 36. The concave interior surface of the outlet segment 36 with which the edge portion 106b of the boot 72 is adapted to extend adjacent is analogous to the concave interior surface 90 of the inlet segment 34. In this manner, the boot 72 is adapted to interlock with a projection of the outlet segment 36 that is analogous to the projection 102 of the inlet segment 34.

Figure 12:
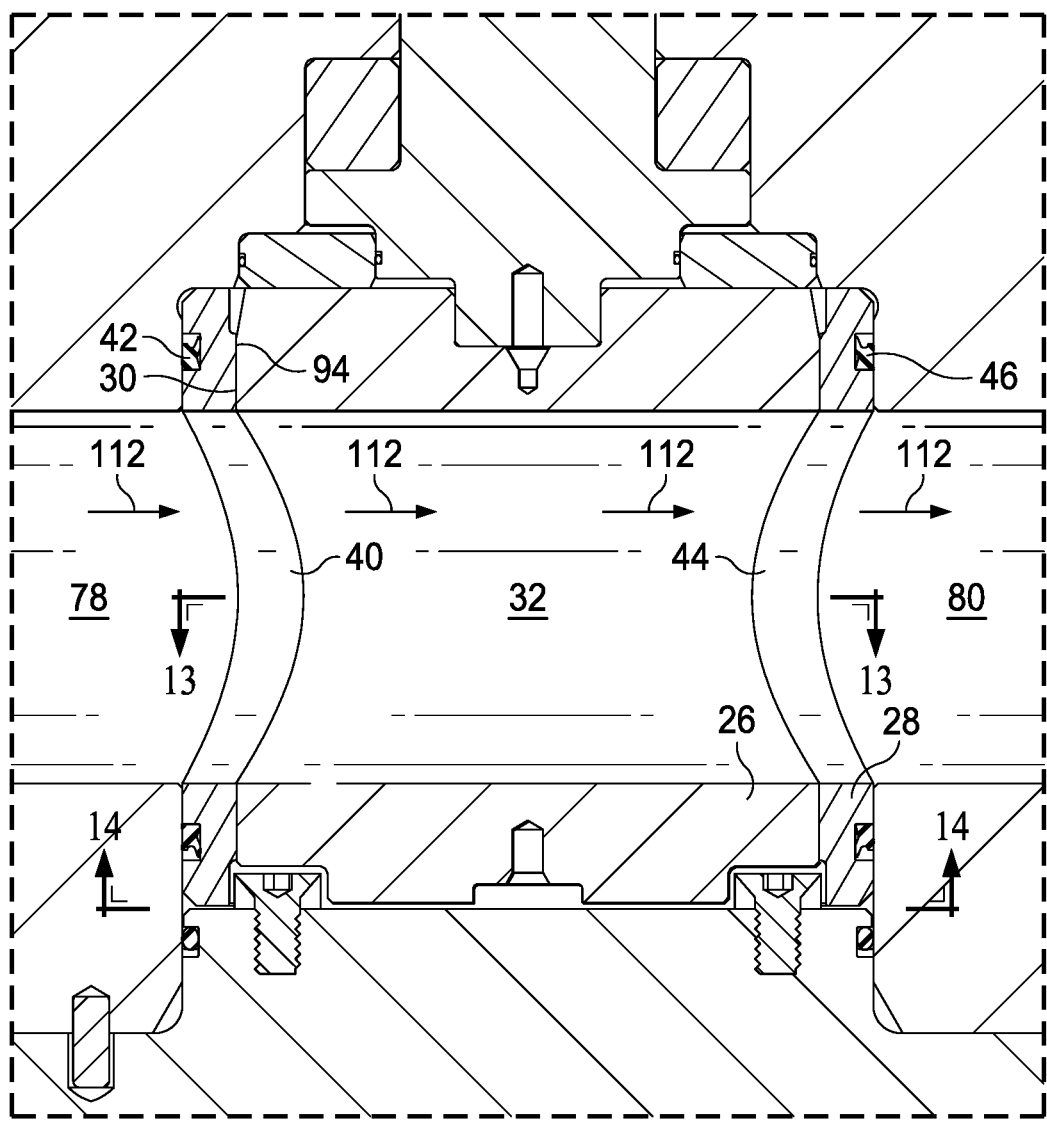
FIG. 12 is an enlarged cross-sectional view of the plug valve of FIG. 2 in a first operational configuration, according to one or more embodiments of the present disclosure.
Figure 13:
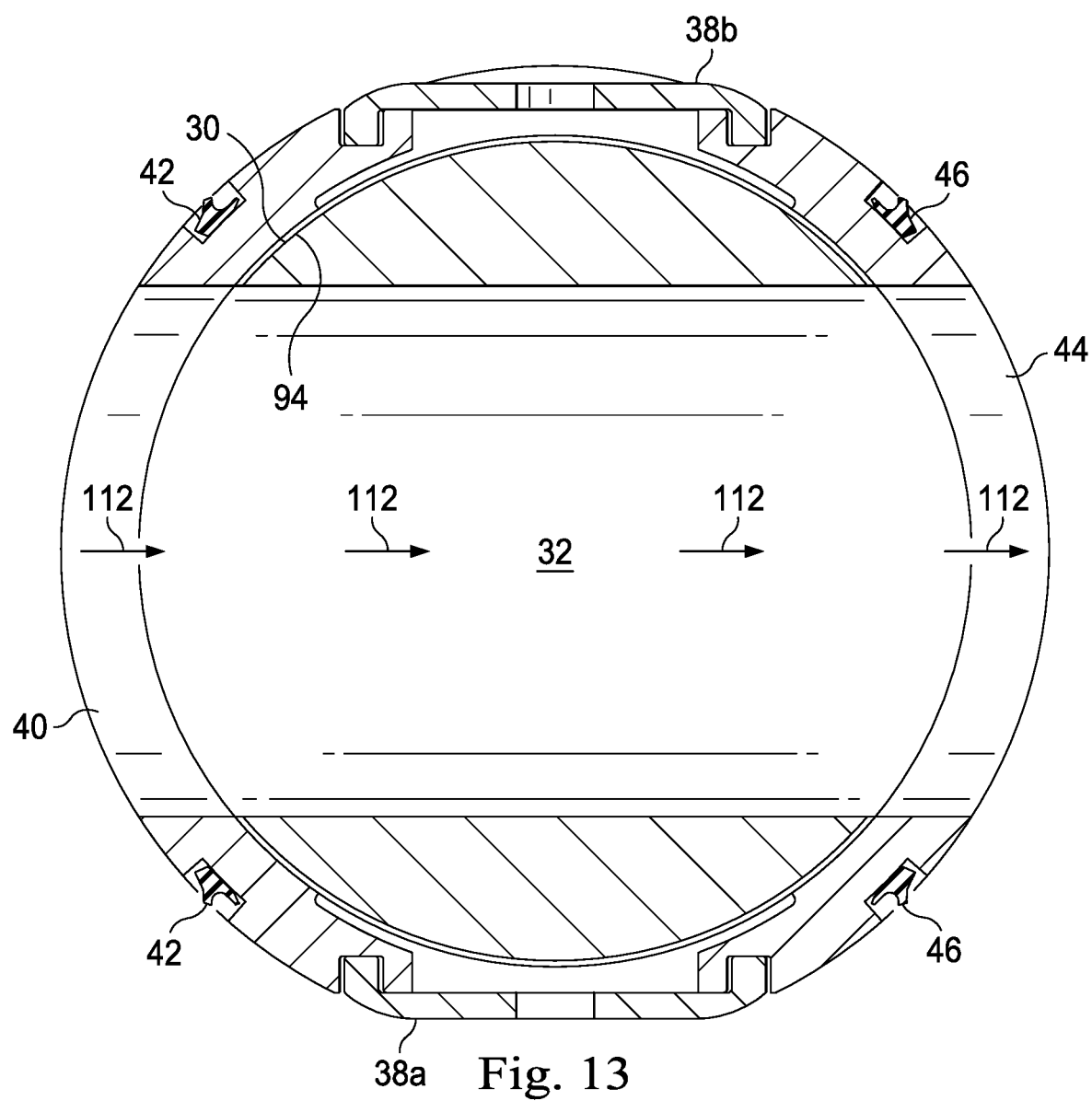
FIG. 13 is a sectional view of the plug valve taken along the line 13-13 of FIG. 12, according to one or more embodiments of the present disclosure.
Figure 14:
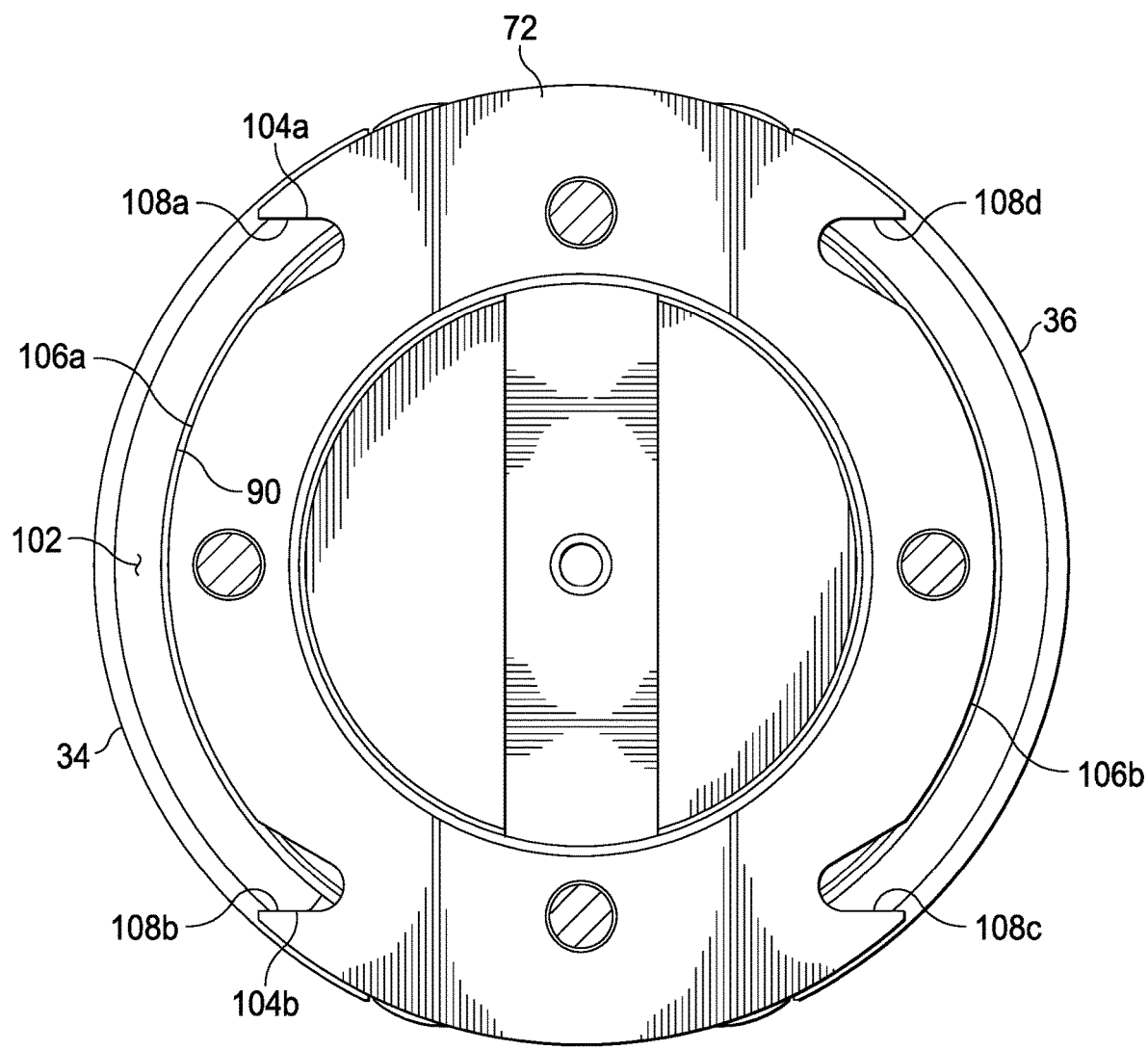
FIG. 14 is a sectional view of the plug valve taken along the line 14-14 of FIG. 12, according to one or more embodiments of the present disclosure.
Figure 15:
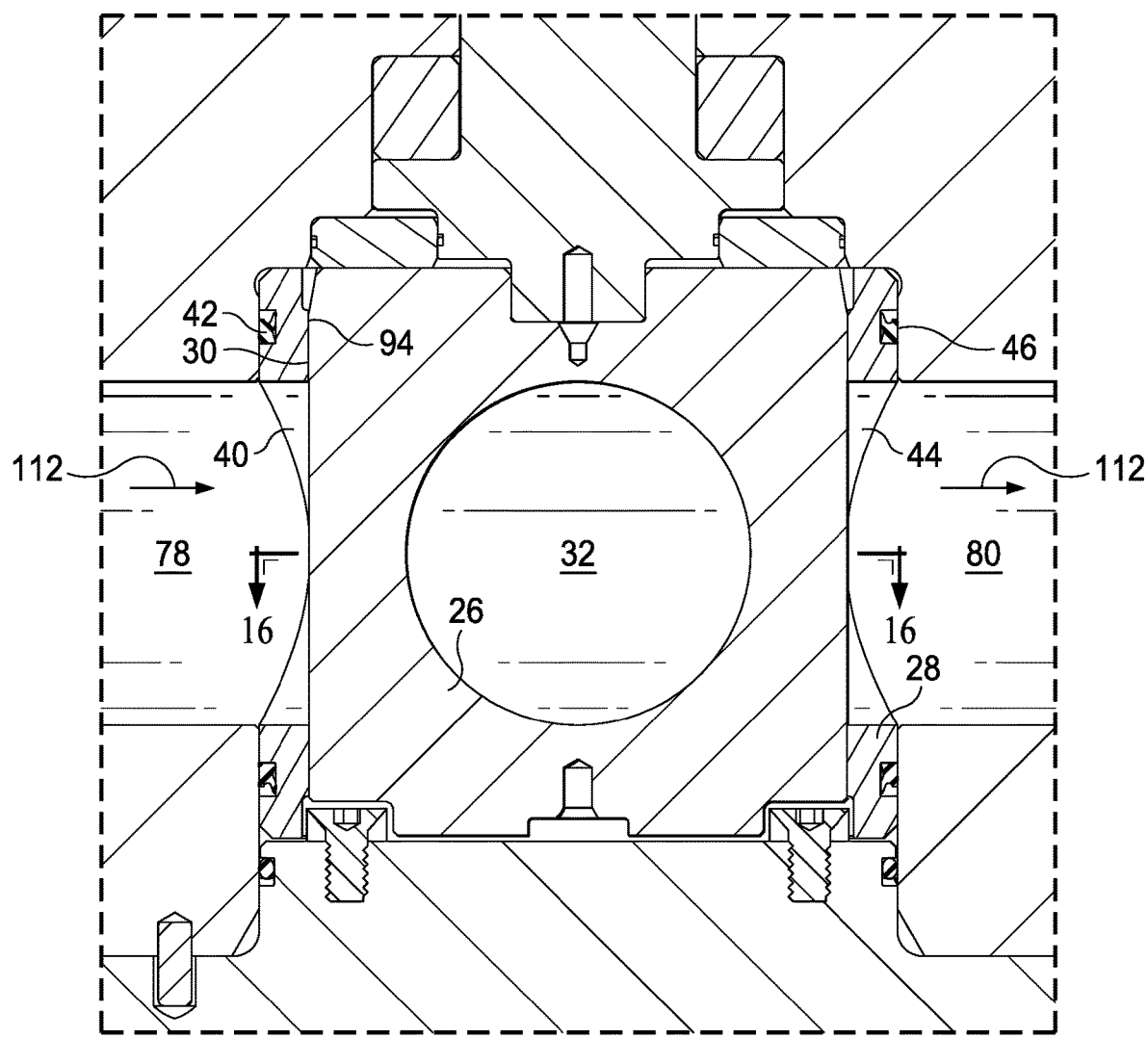
FIG. 15 is an enlarged view of the plug valve similar to that shown in FIG. 12, except that the plug valve is in a second operational configuration, according to one or more embodiments of the present disclosure.
Figure 16:
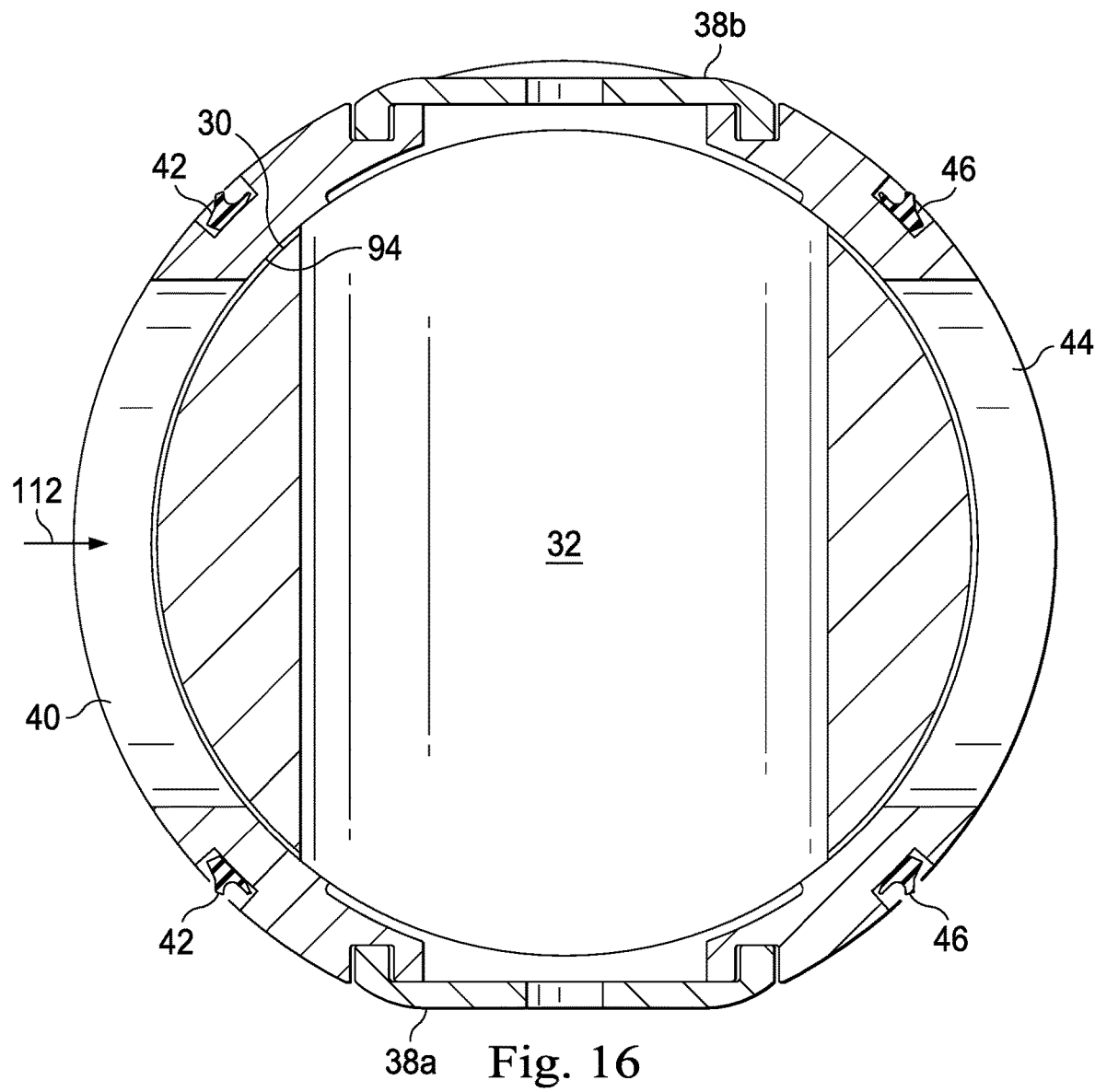
FIG. 16 is a sectional view of the plug valve taken along the line 16-16 of FIG. 15, according to one or more embodiments of the present disclosure.

Turning to FIGS. 12-16, in operation, the plug valve 10 is actuable between the open configuration (shown in FIGS. 12-14) and the closed configuration (shown in FIGS. 15 and 16). Turning to FIGS. 12 and 13, in the open configuration, the fluid passage 32 of the plug 26 is aligned with the inlet and outlet openings 40 and 44 of the insert 28 and the inlet and outlet passages 78 and 80 of the valve body 12 so that fluid flow is permitted through the plug valve 10, as indicated by arrow(s) 112. The inlet seal 42 engages the valve body 12 around the inlet passage 78 to thereby prevent migration of the fluid 112 into an annular region between the insert 28 and the valve body 12 as the fluid 112 enters the fluid passage 32 via the inlet passage 78 and the inlet opening 40. To prevent migration of the fluid 112 into an annular region between the insert 28 and the plug 26, the concave sealing surface 94 of the inlet segment 34 seals against the exterior surface 30 of the plug 26 around the fluid passage 32. In addition, the outlet seal 46 engages the valve body 12 around the outlet passage 80 to thereby prevent migration of the fluid 112 into the annular region between the insert 28 and the valve body 12 as the fluid 112 exits the fluid passage 32 via the outlet opening 44 and the outlet passage 80. To prevent migration of the fluid 112 into the annular region between the insert 28 and the plug 26, the concave sealing surface of the outlet segment 36 (which is analogous to the concave sealing surface 94 of the inlet segment 34) seals against the exterior surface 30 of the plug 26 around the fluid passage 32. The sealing of the inlet and outlet segments 34 and 36 against the plug 26 is aided by the lubricating fluid (not shown) provided at the interface between the plug 26 and the inlet and outlet segments 34 and 36 via, for example, the lubrication fitting(s) 24 (FIG. 1A).

Turning to FIG. 14, it can be seen that the projection 102 of the inlet segment 34 and the projection of the outlet segment 36 (which is analogous to the projection 102 of the inlet segment 34) each interlock with the boot 72 to thereby prevent, or at least reduce, rotation of the insert 28 relative to the valve body 12. More particularly, the edge portions 108a and 108b of the boot 72 extend adjacent the side surfaces 104a and 104b, respectively, of the inlet segment 34, and the edge portion 106a of the boot 72 extends adjacent the concave interior surface 90 of the inlet segment 34. In this manner, the boot 72 interlocks with the projection 102 of the inlet segment 34. In addition, the edge portions 108c and 108d of the boot 72 extend adjacent the surfaces, respectively, of the outlet segment 36 (which are analogous to the side surfaces 104a and 104b of the inlet segment 34), and the edge portion 106b of the boot 72 extends adjacent the concave interior surface of the outlet segment 36 (which is analogous to the concave interior surface 90 of the inlet segment 34). In this manner, the boot 72 interlocks with the projection of the outlet segment 36 (which is analogous to the projection 102 of the inlet segment 34) to prevent, or at least reduce, rotation of the insert 28 relative to the valve body 12. As a result, the substantial alignment between the inlet and outlet openings 40 and 44 of the insert 28 and the inlet and outlet passages 78 and 80, respectively, of the valve body 12 is maintained during the actuation of the plug valve 10 between the open and closed configurations.

Turning to FIGS. 15 and 16, in the closed configuration, the plug 26 is rotated to prevent, or at least reduce, communication of the fluid 112 from the inlet passage 78 to the outlet passage 80 of the valve body 12. To actuate the plug 26 from the open configuration to the closed configuration, the actuator 14 rotates the plug 26 (via the drive gear 50 and the adapter 52) so that the fluid passage 32 of the plug 26 is no longer aligned with the inlet and outlet openings 40 and 44 of the insert 28 or the inlet and outlet passages 78 and 80 of the valve body 12. Instead, the exterior surface 30 of the plug 26 is substantially aligned with the inlet and outlet openings 40 and 44 of the insert 28 and the inlet and outlet passages 78 and 80 of the valve body 12 to thereby block communication of the fluid 112 from the inlet passage 78 to the outlet passage 80 of the valve body 12. The fluid 112 within the inlet passage 78 and the inlet opening 40 is prevented from migrating into the annular region between the insert 28 and the valve body 12 by the sealing engagement of the inlet seal 42 against the valve body 12 around the inlet passage 78. More particularly, to prevent migration of the fluid 112 into the annular region between the insert 28 and the plug 26, the concave sealing surface 94 of the inlet segment 34 seals against the exterior surface 30 of the plug 26. The lubricating fluid (not shown) provided at the interface between the plug 26 and the inlet segment 34 (via, for example, the lubrication fitting(s) 24 (FIG. 1A)) aids with the sealing engagement of the inlet segment 34 against the plug 26. The tensioning of the side segments 38a and 38b between the inlet and outlet segments 34 and 36 prevents the fluid 112 in the inlet passage 78 from unsealing the concave sealing surface 94 of the inlet segment 34 from the exterior surface 30 of the plug 26.

The manner in which the concave sealing surface 94 stands in relief against the concave interior surface 90 of the inlet segment 34 reduces the contact area between the insert 28 and the plug 26. Similarly, the manner in which the outlet segment 36's concave sealing surface (which is analogous to the concave sealing surface 94 of the inlet segment 34) stands in relief against the concave interior surface (which is analogous to the concave interior surface 90 of the inlet segment 34) reduces the contact area between the insert 28 and the plug 26. In addition, the spacing apart of the side segments 38a and 38b from the plug 26 when the side segments 38a and 38b are tensioned between the inlet and outlet segments 34 and 36 reduces the contact area between the insert 28 and the plug 26.

In some embodiments, reducing the contact area between the insert 28 and the plug 26 increases the contact pressure between the insert 28 and the plug 26. In some embodiments, reducing the contact area between the insert 28 and the plug 26 decreases the amount of force required to maintain the contact pressure between the insert 28 and the plug 26 above the minimum threshold required to establish a suitable seal with the plug 26. In some embodiments, reducing the contact area between the insert 28 and the plug 26 enables the side segments 38a and 38b (or another suitable structure or mechanism) to maintain the contact pressure between the insert 28 and the plug 26 above the minimum threshold required to establish a suitable seal with the plug 26.

In some embodiments, reducing the contact area between the insert 28 and the plug 26 decreases the amount of friction between the plug 26 and the insert 28. In some embodiments, reducing the contact area between the insert 28 and the plug 26 mitigates any shifting, turning, or rotation of the insert 28 relative to the valve body 12. In some embodiments, reducing the contact area between the insert 28 and the plug 26 prevents, or at least reduces, misalignment between the inlet and outlet openings 40 and 44 of the insert 28 and the inlet and outlet passages 78 and 80 of the valve body 12. In some embodiments, reducing the contact area between the insert 28 and the plug 26 prevents, or at least reduces, wear, erosion, or complete wash-out of the plug 26, the insert 28, and/or the valve body 12.

In some embodiments, the reduced contact area between the insert 28 and the plug 26 makes possible the manufacture of an effective and reliable "large bore" plug valve 10 in which the fluid passage 32 of the plug 26 has an inner diameter of: about 5⅛ inches, greater than about 5⅛ inches, ranging from about 5⅛ inches to about 7 1/16 inches, about 7 1/16 inches, or greater than about 7 1/16 inches. In some embodiments, the reduced contact area between the insert 28 and the plug 26 permits relaxed tolerances during the manufacture of the insert 28 while maintaining the insert 28's capability to matingly engage the plug 26 so that an effective seal is maintained therebetween.

In some embodiments, the engagement of the boot 72 with the inlet segment 34's projection 102 and/or the outlet segment 36's projection (which is analogous to the projection 102) mitigates any shifting, turning, or rotation of the insert 28 relative to the valve body 12. In some embodiments, the engagement of the boot 72 with the inlet segment 34's projection 102 and/or the outlet segment 36's projection (which is analogous to the projection 102) prevents, or at least reduces, misalignment between the inlet and outlet openings 40 and 44 of the insert 28 and the inlet and outlet passages 78 and 80 of the valve body 12. In some embodiments, the engagement of the boot 72 with the inlet segment 34's projection 102 and/or the outlet segment 36's projection (which is analogous to the projection 102) prevents, or at least reduces, wear, erosion, or complete wash-out of the plug 26, the insert 28, and/or the valve body 12.

In some embodiments, the engagement of the boot 72 with the inlet segment 34's projection 102 and/or the outlet segment 36's projection (which is analogous to the projection 102) makes possible the manufacture of an effective and reliable "large bore" plug valve 10 in which the fluid passage 32 of the plug 26 has an inner diameter of: about 5⅛ inches, greater than about 5⅛ inches, ranging from about 5⅛ inches to about 7 1/16 inches, about 7 1/16 inches, or greater than about 7 1/16 inches.

Figure 17:
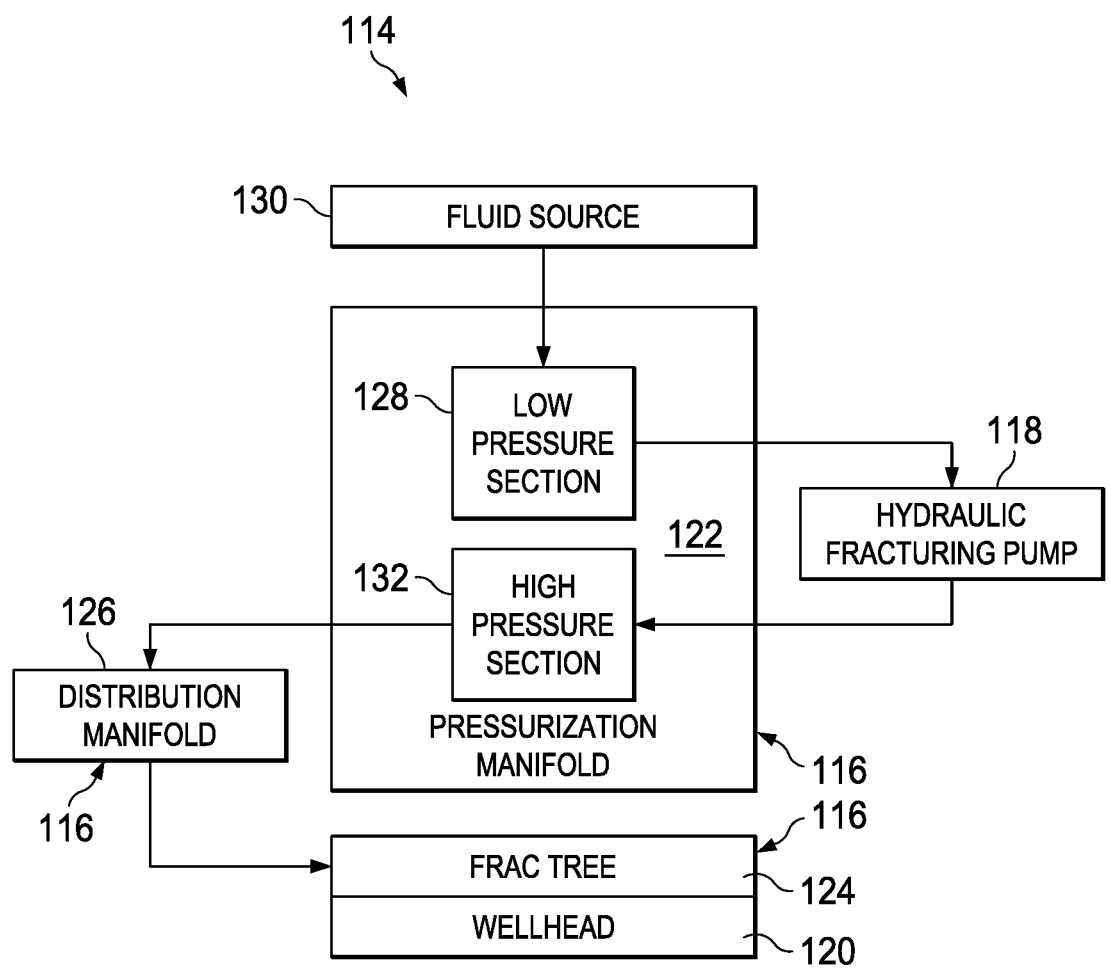
FIG. 17 is a schematic illustration of a hydraulic fracturing system, the hydraulic fracturing system including a hydraulic fracturing pump, a flow iron section, and a wellhead, according to one or more embodiments of the present disclosure.

Turning to FIG. 17, with continuing reference to FIGS. 1-16, a hydraulic fracturing system, generally referred to by the reference numeral 114, is illustrated. The hydraulic fracturing system 114 includes a flow iron section 116 positioned between a hydraulic fracturing pump 118 and a wellhead 120. The flow iron section 116 includes one or more of: a pressurization manifold 122 connected to the hydraulic fracturing pump 118, a hydraulic fracturing tree 124 connected to the wellhead 120, and a distribution manifold 126 connected between the pressurization manifold 122 and the hydraulic fracturing tree 124. The pressurization manifold 122 includes a low pressure section 128 connected between a fluid source 130 and the hydraulic fracturing pump 118, and a high pressure section 132 connected between the hydraulic fracturing pump 118 and the distribution manifold 126. In addition to, or instead of, the hydraulic fracturing pump 118, the hydraulic fracturing system 114 may include other hydraulic fracturing pump(s) (not shown) to facilitate pressurization of the hydraulic fracturing fluid from the low pressure section 128 and communication of the pressurized hydraulic fracturing fluid to the high pressure section 132. The wellhead 120 is located at the top or head of an oil and gas wellbore (not shown), which penetrates one or more subterranean formations (not shown). In addition to, or instead of, the wellhead to which the fracturing tree is connected, the hydraulic fracturing system 114 may also include one or more wellheads (not shown) to which fracturing trees (not shown) are connected; the distribution manifold 126 facilitates communication of the pressurized hydraulic fracturing fluid to such wellhead(s) via the corresponding fracturing tree(s).

In operation, the hydraulic fracturing fluid is communicated from the hydraulic fracturing pump 118 to the wellhead 120 via at least the flow iron section 116 to thereby facilitate hydraulic fracturing of the subterranean formation (s). More particularly, the hydraulic fracturing fluid is communicated from the fluid source 130 to the low pressure section 128 of the pressurization manifold 122. The hydraulic fracturing pump 118 receives the hydraulic fracturing fluid from the low pressure section 128, pressurizes the hydraulic fracturing fluid, and communicates the pressurized hydraulic fracturing fluid to the high pressure section 132. The high pressure section 132 communicates the pressurized hydraulic fracturing fluid from the hydraulic fracturing pump 118 to the distribution manifold 126. The distribution manifold 126 communicates the pressurized hydraulic fracturing fluid from the high pressure section 132 of the pressurization manifold 122 to the hydraulic fracturing tree 124 connected to the wellhead 120.

Figure 18:
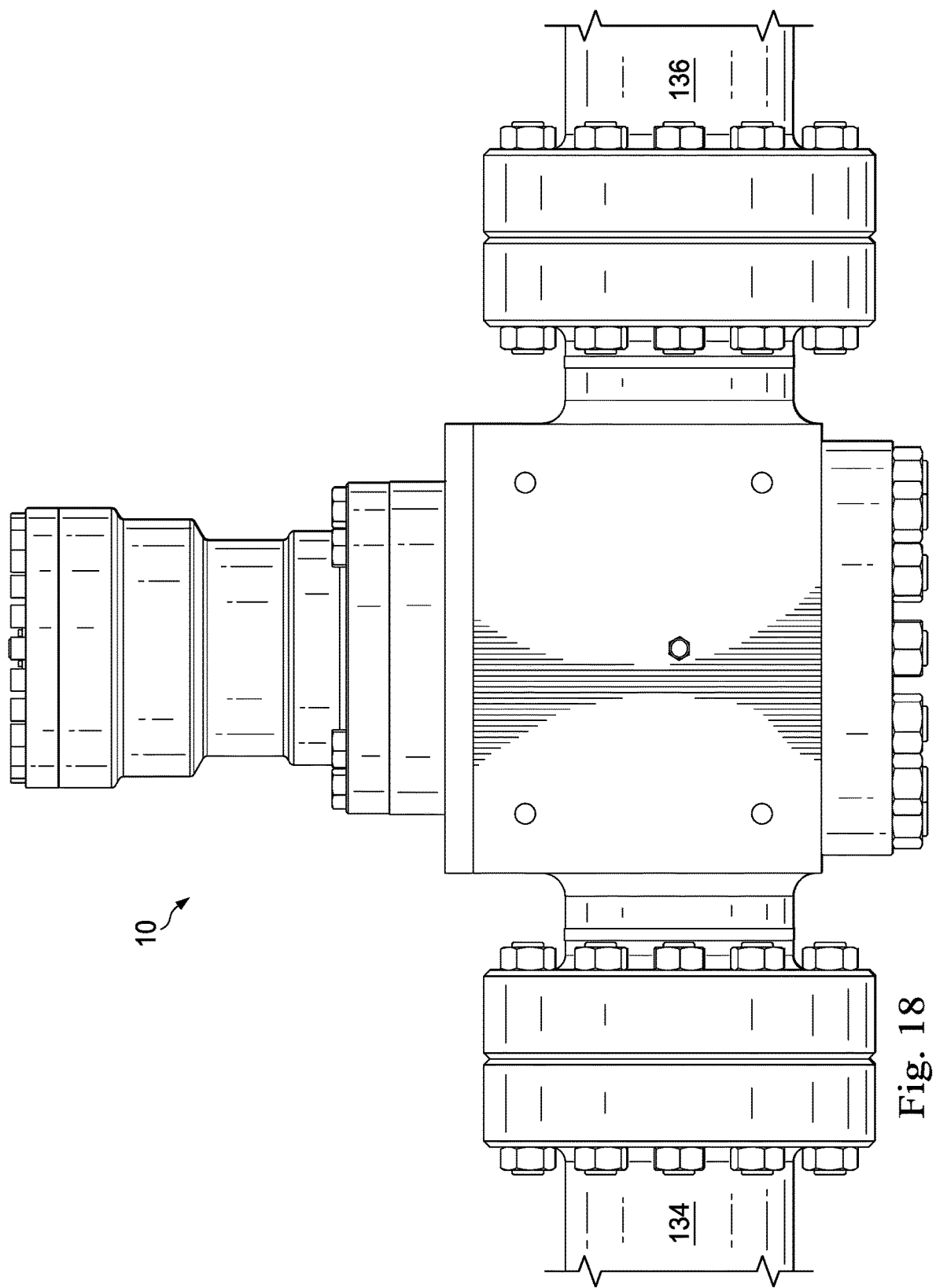
FIG. 18 is an elevational view of the plug valve of FIGS. 1-16 connected between a pair of flow-line components, which flow-line components are part of the flow iron section of FIG. 17, according to one or more embodiments of the present disclosure.

Turning to FIG. 18, with continuing reference to FIG. 17, it can be seen that the flange 86 of the valve body 12 is connected to the flow-line component 134, and the flange 88 of the valve body 12 is connected to the flow-line component 136. The flow-line component 134 is connected to, or part of, the flow iron section 116, including one or more of the pressurization manifold 122 connected to the hydraulic fracturing pump 118, the hydraulic fracturing tree 124 connected to the wellhead 120, and the distribution manifold 126 connected between the pressurization manifold 122 and the hydraulic fracturing tree 124. Likewise, the flow-line component 134 is connected to, or part of, the flow iron section 116, including one or more of the pressurization manifold 122, the hydraulic fracturing tree 124, and the distribution manifold 126. The connection of the valve body 12 between the flow-line components 134 and 136 incorporates the plug valve 10 into the hydraulic fracturing system 114 so that, during the operation of the hydraulic fracturing system 114 to facilitate hydraulic fracturing of the subterranean formation(s), the plug 26 is rotatable within the valve body 12 to selectively permit communication of the hydraulic fracturing fluid from the hydraulic fracturing pump 118 to the wellhead 120 via at least the flow iron section 116 and the fluid passage 32 of the plug 26.

The flow-line components 134 and 136 to which the plug valve 10 is connected are illustrated in FIG. 18 as a pair of spools; however, the flow-line components 134 and 136 may each be, include, or be part of, a variety of flow-line components including, but not limited to, a valve, a spool, a flow block, a swivel block, another flow-line component, or any combination thereof. In addition, depending upon the particular characteristics of the flow iron section 116 to which the plug valve 10 is connected, the flow-line components 134 and 136 and the plug valve 10 may be oriented differently than the orientation illustrated in FIG. 18 (i.e., horizontally, vertically, diagonally, etc.).

It is understood that variations may be made in the foregoing without departing from the scope of the present disclosure.

In some embodiments, the elements and teachings of the various embodiments may be combined in whole or in part in some or all of the embodiments. In addition, one or more of the elements and teachings of the various embodiments may be omitted, at least in part, and/or combined, at least in part, with one or more of the other elements and teachings of the various embodiments.

In some embodiments, while different steps, processes, and procedures are described as appearing as distinct acts, one or more of the steps, one or more of the processes, and/or one or more of the procedures may also be performed in different orders, simultaneously and/or sequentially. In some embodiments, the steps, processes and/or procedures may be merged into one or more steps, processes and/or procedures.

In some embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "left" and right, "front" and "rear", "above" and "below" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

Although some embodiments have been described in detail above, the embodiments described are illustrative only and are not limiting, and those skilled in the art will readily appreciate that many other modifications, changes and/or substitutions are possible in the embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112, paragraph 6 for any limitations of any of the claims herein, except for those in which the claim expressly uses the word "means" together with an associated function.

What is claimed is:

1. An apparatus, comprising:
   a valve body defining an internal cavity, a first passage, and a second passage;
   a plug defining a third passage and being rotatable within the internal cavity to selectively permit communication of a fluid between the first and second passages via the third passage;
   an insert extending within the internal cavity between the valve body and the plug, the insert defining a first opening aligned with the first passage of the valve body, a first interior surface, and a first circular seal extending circularly around the first opening and standing in relief against the first interior surface to sealingly engage the plug; and
   a boot connected to the valve body and including a first edge portion extending adjacent the first interior surface, the boot preventing, or at least reducing, rotation of the insert relative to the valve body when the plug rotates within the internal cavity;
   wherein migration of the fluid into an annular region between the insert and the plug is prevented, or at least reduced, by the sealing engagement of the first circular seal with the plug.

2. The apparatus of claim 1, wherein the insert comprises a first segment including the first interior surface, the first opening, and the first circular seal.

3. The apparatus of claim 1, wherein the insert further defines a second opening aligned with the second passage of the valve body, a second interior surface, and a second circular seal extending circularly around the second opening and standing in relief against the second interior surface to sealingly engage the plug.

4. The apparatus of claim 3, wherein migration of the fluid into the annular region between the insert and the plug is prevented, or at least reduced, by the respective sealing engagements of the first and second circular seals with the plug.

5. The apparatus of claim 3, wherein the insert comprises a first segment including the first interior surface, the first opening, and the first circular seal, and a second segment including the second interior surface, the second opening, and the second circular seal.

6. The apparatus of claim 5, wherein the insert further comprises third and fourth segments interconnecting the first and second segments so that, in combination, the first, second, third, and fourth segments surround the plug.

7. The apparatus of claim 1, further comprising:
   a flow iron section adapted to be positioned between a hydraulic fracturing pump and a wellhead, the flow iron section comprising one or more of a pressurization manifold connected to the hydraulic fracturing pump, a hydraulic fracturing tree connected to the wellhead, and a distribution manifold connected between the pressurization manifold and the hydraulic fracturing tree;
   wherein the valve body is connected to the flow iron section so that the plug is rotatable within the valve body to selectively permit communication of a hydraulic fracturing fluid from the hydraulic fracturing pump to the wellhead via at least the flow iron section and the third passage.

8. An apparatus, comprising:
   a valve body defining an internal cavity, a first passage, and a second passage;
   a plug defining a third passage and being rotatable within the internal cavity to selectively permit communication of a fluid between the first and second passages via the third passage;
   an insert extending within the internal cavity between the valve body and the plug, the insert defining a first opening aligned with the first passage of the valve body, a first interior surface, and a first projection at least partially defining the first interior surface; and
   a boot connected to the valve body and including a first edge portion extending adjacent the first interior surface, the boot interlocked with the first projection of the insert to prevent, or at least reduce, rotation of the insert relative to the valve body when the plug rotates within the internal cavity.

9. The apparatus of claim 8, wherein the first projection includes first and second side surfaces, and the boot includes second and third edge portions extending adjacent the first and second side surfaces, respectively, of the first projection.

10. The apparatus of claim 9, wherein the first edge portion extends between the second and third edge portions.

11. The apparatus of claim 8, wherein:
the insert further defines a second opening aligned with the second passage of the valve body, a second interior surface, and a second projection at least partially defining the second interior surface; and
the boot is interlocked with the second projection of the insert to prevent, or at least reduce, rotation of the insert relative to the valve body when the plug rotates within the internal cavity.

12. The apparatus of claim 11, wherein:
the first projection includes first and second side surfaces, and the boot includes second and third edge portions extending adjacent the first and second side surfaces, respectively, of the first projection; and
the second projection includes third and fourth side surfaces, and the boot includes fourth and fifth edge portions extending adjacent the third and fourth side surfaces, respectively, of the second projection.

13. The apparatus of claim 12, wherein the first edge portion extends between the second and third edge portions; and
wherein the boot further includes a sixth edge portion extending between the fourth and fifth edge portions and adjacent the second interior surface of the insert.

14. The apparatus of claim 11, wherein the insert comprises a first segment including the first interior surface, the first projection, and the first opening, and a second segment including the second interior surface, the second projection, and the second opening.

15. The apparatus of claim 14, wherein the insert further comprises third and fourth segments interconnecting the first and second segments so that, in combination, the first, second, third, and fourth segments surround the plug.

16. The apparatus of claim 8, further comprising:
a flow iron section adapted to be positioned between a hydraulic fracturing pump and a wellhead, the flow iron section comprising one or more of a pressurization manifold connected to the hydraulic fracturing pump, a hydraulic fracturing tree connected to the wellhead, and a distribution manifold connected between the pressurization manifold and the hydraulic fracturing tree; and
wherein the valve body is connected to the flow iron section so that the plug is rotatable within the valve body to selectively permit communication of a hydraulic fracturing fluid from the hydraulic fracturing pump to the wellhead via at least the flow iron section and the third passage.

17. An apparatus, comprising:
a flow iron section adapted to be positioned between a hydraulic fracturing pump and a wellhead, the flow iron section comprising one or more of a pressurization manifold connected to the hydraulic fracturing pump, a hydraulic fracturing tree connected to the wellhead, and a distribution manifold connected between the pressurization manifold and the hydraulic fracturing tree; and
a plug valve connected to the flow iron section, the plug valve comprising
a valve body defining a first passage,
a plug defining a second passage and being rotatable within the valve body to selectively permit communication of a hydraulic fracturing fluid from the hydraulic fracturing pump to the wellhead via at least the flow iron section and the second passage, the second passage having an inner diameter that is equal to, or greater than, about 5⅛ inches,
an insert extending within the valve body between the valve body and the plug, the insert defining an opening aligned with the first passage of the valve body, an interior surface, and a projection at least partially defining the interior surface, and
a boot connected to the valve body and including an edge portion extending adjacent the interior surface, the boot interlocked with the projection of the insert to prevent, or at least reduce, rotation of the insert relative to the valve body when the plug rotates within the valve body.

18. The apparatus of claim 17, wherein the valve body further defines a third passage configured to communicate with the first passage via the second passage of the plug when communication of the hydraulic fracturing fluid is selectively permitted from the hydraulic fracturing pump to the wellhead via at least the flow iron section and the second passage.

19. The apparatus of claim 18, wherein the insert defines a sealing surface extending around the opening and standing in relief against the interior surface to sealingly engage the plug.

* * * * *